United States Patent [19]
Johnson et al.

[11] Patent Number: 5,577,567
[45] Date of Patent: Nov. 26, 1996

[54] STAIR CLIMBING WHEELCHAIR

[76] Inventors: Robert E. Johnson; Deborah K. Johnson, both of 1417 Kasten Dr., Dolton, Ill. 60419

[21] Appl. No.: 360,245

[22] Filed: Dec. 20, 1994

[51] Int. Cl.⁶ .................................................. B62D 55/075
[52] U.S. Cl. .................. 180/9.23; 180/907; 280/5.22; 280/6.1; 280/DIG. 10
[58] Field of Search ................................ 180/9.1, 9.23, 180/9.32, 9.42, 8.1, 8.2, 907; 280/840, 6.1, 6.11, 5.2, 5.22, DIG. 10

[56] References Cited

U.S. PATENT DOCUMENTS

| | | | |
|---|---|---|---|
| 3,231,036 | 1/1966 | Appendrodt | 280/840 X |
| 3,288,234 | 11/1966 | Feliz | 180/9.23 |
| 3,869,011 | 3/1975 | Jensen | 180/9.23 |
| 4,483,407 | 11/1984 | Iwamoto et al. | 180/9.23 X |
| 4,566,551 | 1/1986 | Feliz | 180/907 X |
| 4,687,068 | 8/1987 | Pagett | 180/8.2 |
| 4,688,813 | 8/1987 | Misawa et al. | 180/8.2 X |
| 4,763,742 | 8/1988 | Langford | 280/840 |
| 4,977,971 | 12/1990 | Crane, III et al. | 280/840 X |
| 5,123,495 | 6/1992 | Littlejohn et al. | 180/9.32 |
| 5,395,129 | 3/1995 | Kao | 180/8.2 X |

Primary Examiner—Kevin T. Hurley
Attorney, Agent, or Firm—Marshall, O'Toole, Gerstein, Murray & Borun

[57] ABSTRACT

In order to provide safe and effective surface climbing and descending vehicles, the vehicle includes a base for supporting a platform to be maintained in a generally horizontal orientation. The mechanism automatically raises and lowers the platform as the vehicle is descending or climbing the surface, respectively, in order to maintain the platform in the generally horizontal orientation. With this arrangement, the vehicle further includes a pair of endless belts normally to be maintained in driving engagement with the surface in a manner to conform to the surface during climbing and descending.

24 Claims, 37 Drawing Sheets

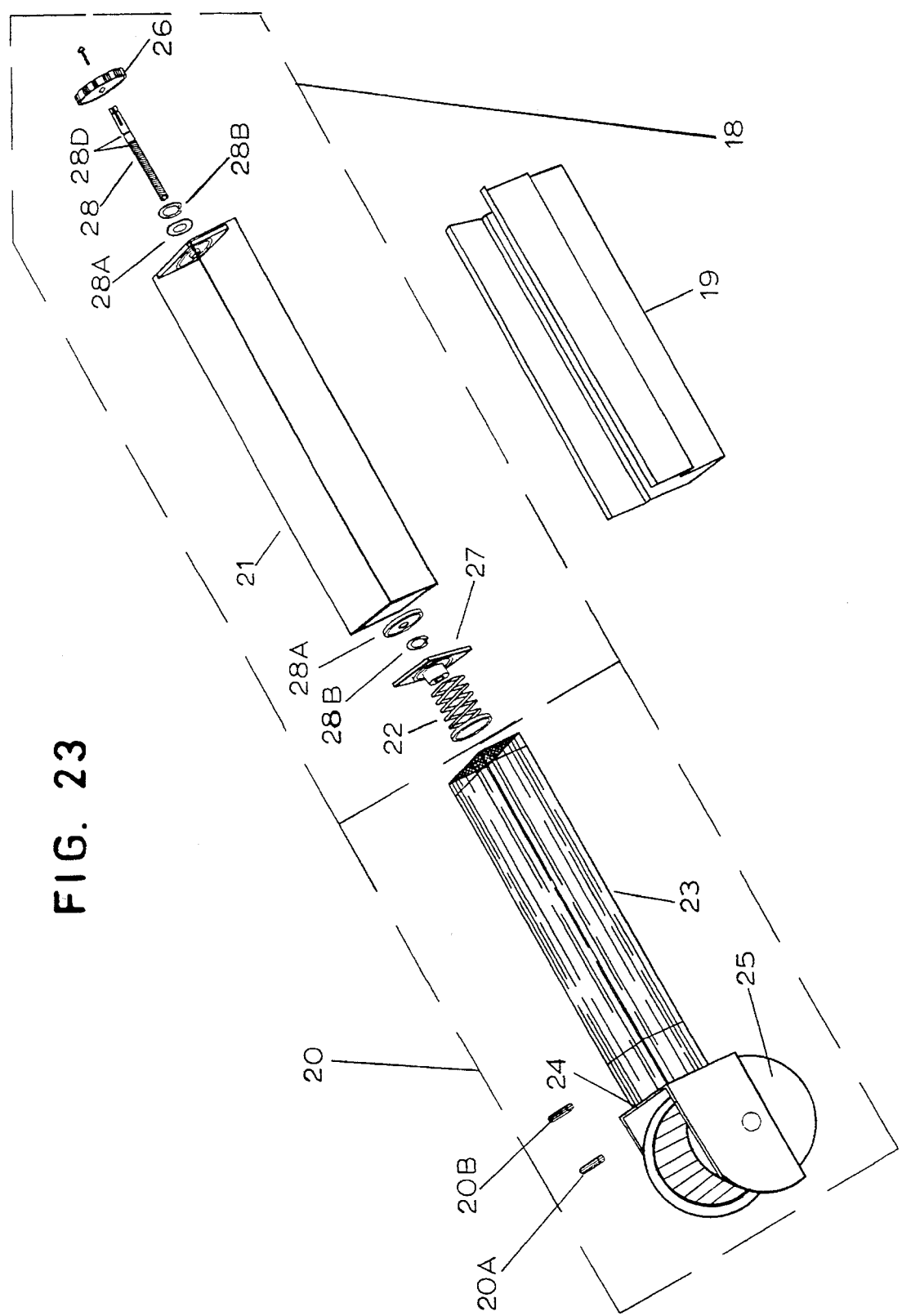

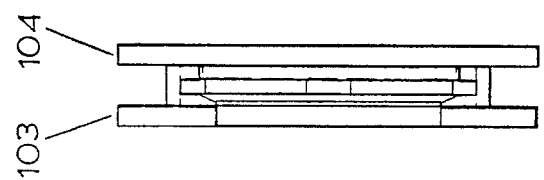
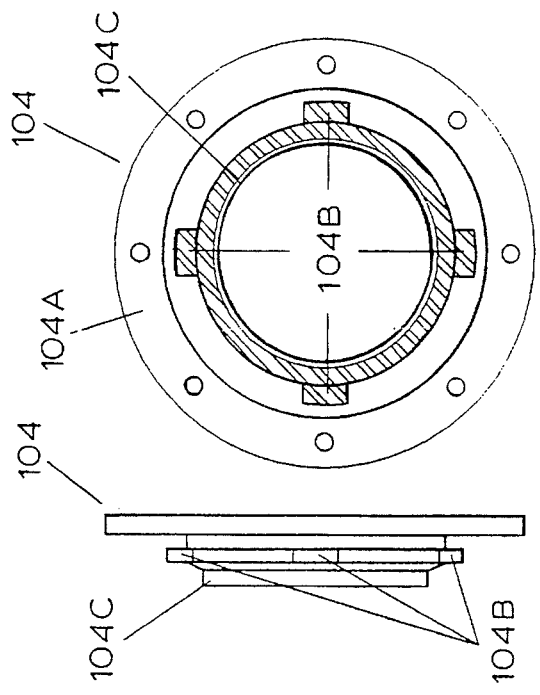
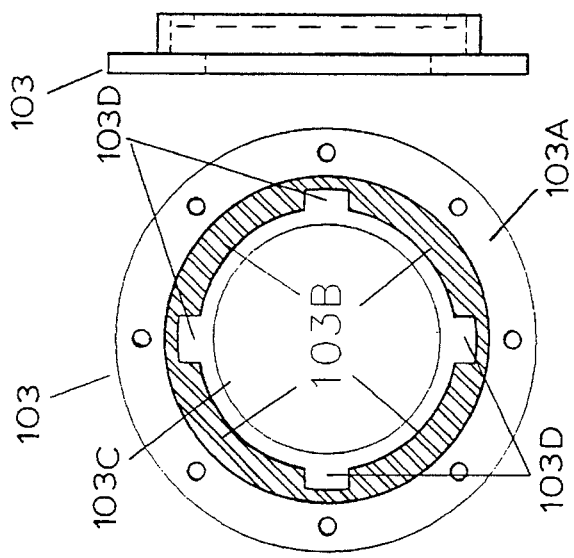

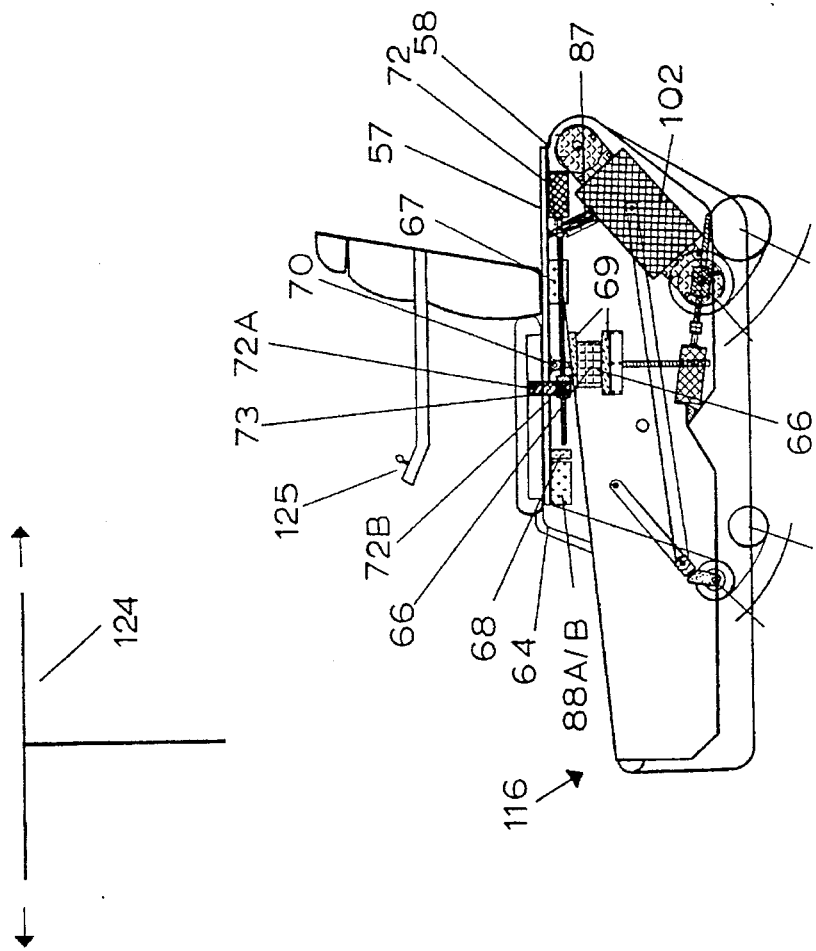
FIG. 47
FIG. 48
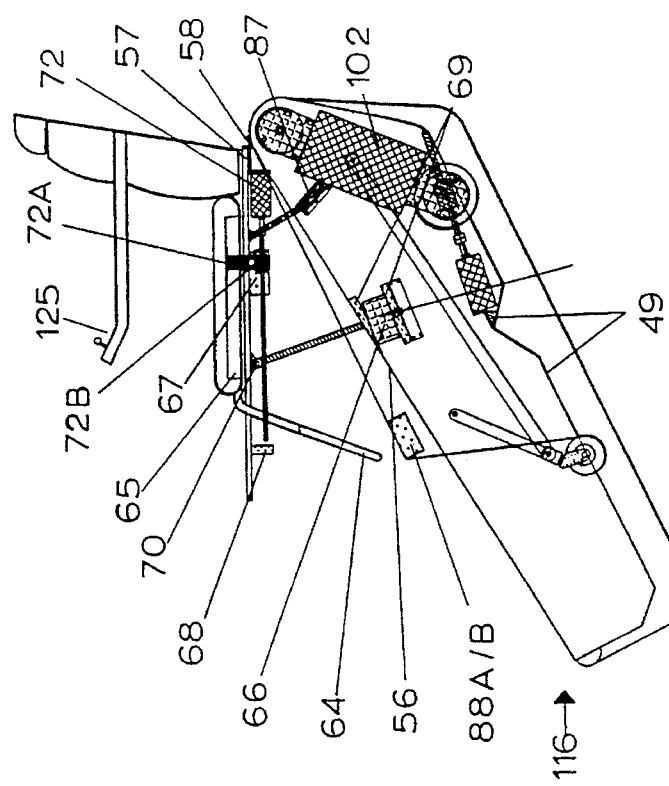
FIG. 46

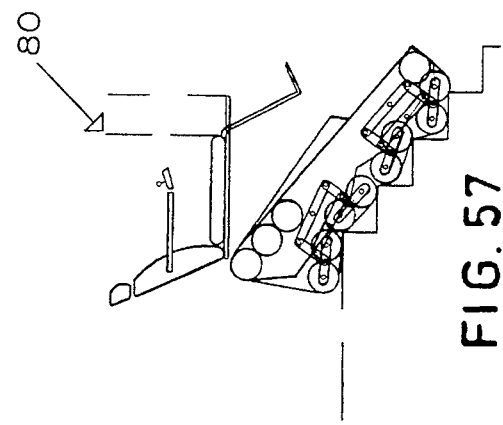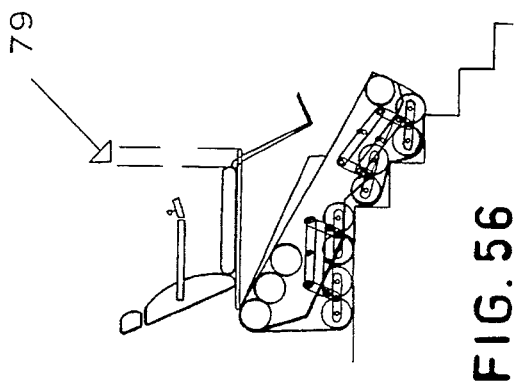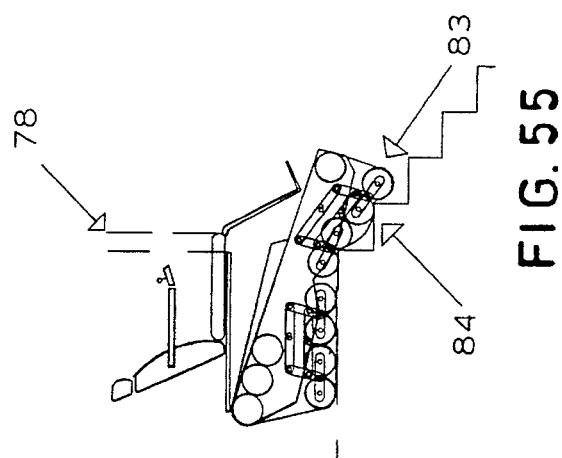

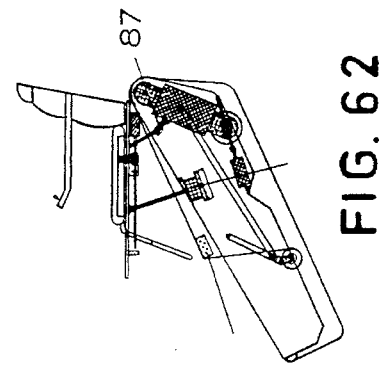
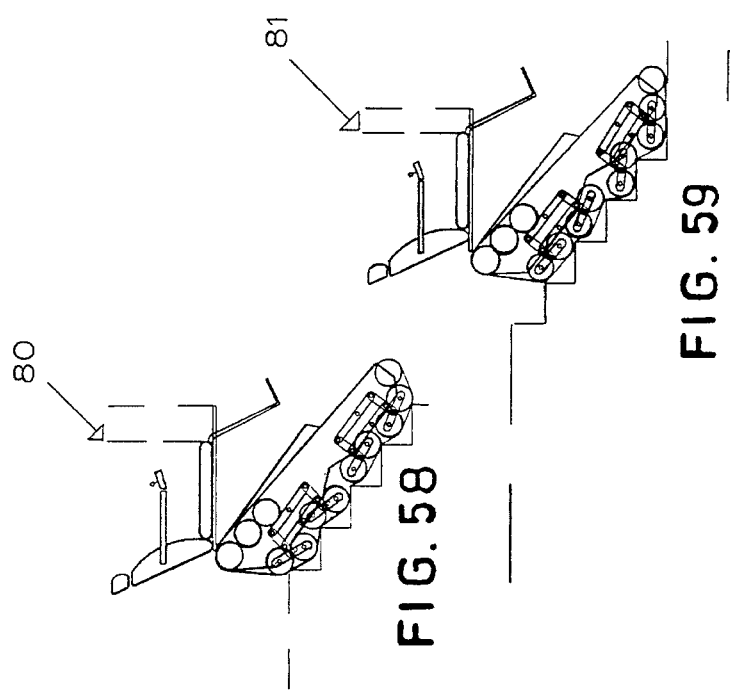
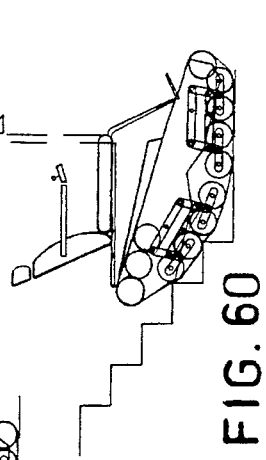
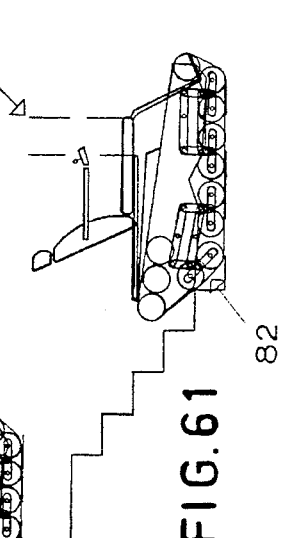

STAIR CLIMBING WHEELCHAIR

BACKGROUND OF THE INVENTION

This invention relates to new and useful improvements to step traversing vehicles. The principal object of the invention is to provide a vehicle which is capable of climbing and descending steps, stairs, curbs, ramps, low platforms, or the like.

As such, the patent is concerned with vehicles of the wheelchair type, wherein the step or stair climbing and descending ability of the invention is highly desirable in order to permit the occupant to travel from one level to another as well as from place to place on the same level without confinement to the same level which is inherent in occupant-propelled and motorized wheel chairs of conventional types. However, use of the invention is not confined to wheelchairs, since the invention is also applicable to: high-rise building emergency escape vehicles; multi-level patient stretchers; gurneys; casket carriers; multi-level remote controlled, videocam equipped security and utility robot ambulations; pushcarts; shopping baskets; and other wheeled conveyances of this general nature.

PRESENT ART

With specific regard to wheelchairs, several brilliant attempts have been made in the past to equip them with stair traversing means, but for the most part these notable attempts have resulted in devices with complex mechanical arrangements with attendant difficulties of operation, maintenance, and/or high manufacturing cost. Also such devices were bulky, produced pronounced wear and tear on the surfaces they traversed, or maintained minimal engagement with the stairs via a few cleats on an endless-belt. These non-step conforming endless belt devices do not establish a transient, step contour lock and are forced to slow to a snail's pace through step-to-step and level-to-incline transitions in an effort to reduce stair slippage and some of the forward and backward lurching of the occupant (cargo) transported. These devices do not allay ergonomic, safety and/or potential OSHA concerns, and continue to cause much occupant anxiety as the devices lurch through each step ascended or descended.

This invention FIG. 1, eliminates these various disadvantages by providing a base unit comprised of a multi-wall frame with an undercarriage incorporating an endless belt (track), and four two wheeled truck assemblies on each side of the vehicle that independently deform to conform to the shape of the surface(s) (stair-curb-obstacle) traversed, enabling multiple positive contour grips with the stairs. This design greatly increases surface grasp in tandem with the cleats of the endless belt. The cargo platform is automatically maintained horizontal to earth's gravity at all times eliminating the anxiety experienced in present chairs when the seat is pre-tilted to the rear in advance of a climb or descent. The truck assemblies of the base unit are designed to adjust to the contours of relatively large surface irregularities and traverse them without significantly conducting the surface deviations to the cargo platform. The deformations assure a smooth, lurchless, step to step traverse without pitch moments, as the occupant completes an anxiety-free transition from level to decline or incline.

Base units are equipped with two or four retractable wheels. When two wheels are extended on flat surfaces, the fronts of the endless belts are raised decreasing their contact with the ground while increasing maneuverability. When four wheels are extended on flat surfaces, the tracks are fully raised from contact with the ground. Both wheel arrangements reduce battery power consumption and extend battery recharge intervals.

The base unit in the track mode has greater strength, safety, and achieves a smoother traverse over stairs and other rugged terrain because the track mechanisms are attached directly to the base unit frame, unlike many other stair climbing units with fixed wheels that raise and lower the track mechanisms to access the climb/descend modes.

The base unit is ideal for unassisted emergency escapes from high-rise buildings because a centrifugal brake and clutch consuming essentially no battery power, control a virtually limitless descent.

The step traversing base unit is light in weight, made of high strength, low friction, high lubricity, non-rusting materials. All electronic plug-in boards and mechanical components are modular, manufactured at very low cost and user serviceable. The design is safe, compact, stable, simple, inexpensive, and yet reliable in its performance.

Other objects and features of the invention will become apparent from the following description taken in conjunction with the accompanying drawings, wherein like characters of reference are employed to designate like parts, and wherein:

BRIEF DESCRIPTION OF THE DRAWINGS

FIG. 13 Illustrates a Base Unit with the "first wheel" dropping into the first stair cavity commencing a descent.

FIG. 14 Illustrates a Base Unit with the "first truck" dropping into the first stair cavity commencing a descent.

FIG. 15 Illustrates a Base Unit with the "first three wheels" adjusting to the shape of the stair cavities entering the descent.

FIG. 16 Illustrates a Base Unit with the "first truck assembly's trucks" following each stair cavity entering the descent.

FIG. 17 Illustrates a Base Unit with the "first truck assembly" and the "third truck" adjusting to the shape of each stair cavity entering the descent.

FIG. 18 Illustrates a Base Unit with the "four trucks of two truck assemblies" adjusting to the shape of each stair cavity through the descent.

FIG. 19 Illustrates a Base Unit with the "first truck" aligning with the ground, while the remaining three trucks continue to flow into each stair cavity through the descent.

FIG. 20 Illustrates a Base Unit with the "first truck assembly" on the ground, while the remaining truck assembly continues to follow the stair cavities through the descent.

FIG. 21 Illustrates a Base Unit completing a descent with the "first three trucks" aligned with the ground, while the last truck negotiates the last stair of the descent.

FIG. 23 An exploded view of an endless belt tension control unit along with its idler pulley, idler pulley holder and bracket.

FIG. 38 An enlarged view of the half of a radial hinge attached to the Base Unit frame.

FIG. 39 An enlarged view of the half of a radial hinge attached to the traction motor.

FIG. 40 An enlarged view of the two halves of a radial hinge mated.

FIG. 46 Inclined Base Unit view showing pitch and horizontal positioning actuators and sensors.

FIG. 47 Side Base Unit view showing pitch and horizontal positioning actuators and sensors.

FIG. 48 Diagram illustrating "Perpendicular to Gravity" reference.

FIG. 52 through 61 show relational positions of the Base Unit pitch to the Seat (or Ball Slide Table) horizontal position on a level Cargo Platform, through ascent/descent operations (Base Unit pitch change and compensating seat repositioning). Specifically:

FIG. 52 Base Unit level; seat in normal position (step 1).

FIG. 53 Base Unit entering descent; seat repositioned partially forward (step 2).

FIG. 54 Base Unit entering descent; seat repositioned fully forward (step 3).

FIG. 55 Base Unit entering descent; seat repositioned partially back to normal (step 4).

FIG. 56 Base Unit entering descent; seat repositioned partially rearward (step 5).

FIG. 57 Base Unit entering descent; seat repositioned fully rearward (step 6).

FIG. 58 Base Unit completely in descent; seat repositioned fully rearward (step 7).

FIG. 59 First Base Unit trucks reach ground; seat repositioned forward, just to rear of normal (step 8).

FIG. 60 Three Base Unit trucks reach ground; seat repositioned partially forward of normal (step 9).

FIG. 61 Most Base Unit trucks reach ground; seat repositioned fully forward of normal, to subsequently be brought back to normal as remaining trucks reach the ground (step 10).

FIG. 62 Inclined side view of Base Unit showing pitch axis sensor and differential level sensor positions.

FIG. 69 Block Diagram of Seat Level Control

FIG. 70 Block Diagram of Base Unit Pitch Control

FIG. 71 Block Diagram of Base Unit Roll Axis Control

FIG. 72 Block Diagram of Endless Belt Tension Control

FIG. 73 Block Diagram of Seat Center Of Gravity Control

FIG. 74 Block Diagram of Sonar Units Logic Circuits

FIG. 75 Block Diagram of Operator Traction Motor Controls

FIG. 76 Block Diagram of Logic Circuits and Traction Motor Controls

FIG. 77 Block Diagram of Seat Horizontal Position Control

DETAILED DESCRIPTION OF PREFERRED EMBODIMENTS OF THE INVENTION

Figure 1:
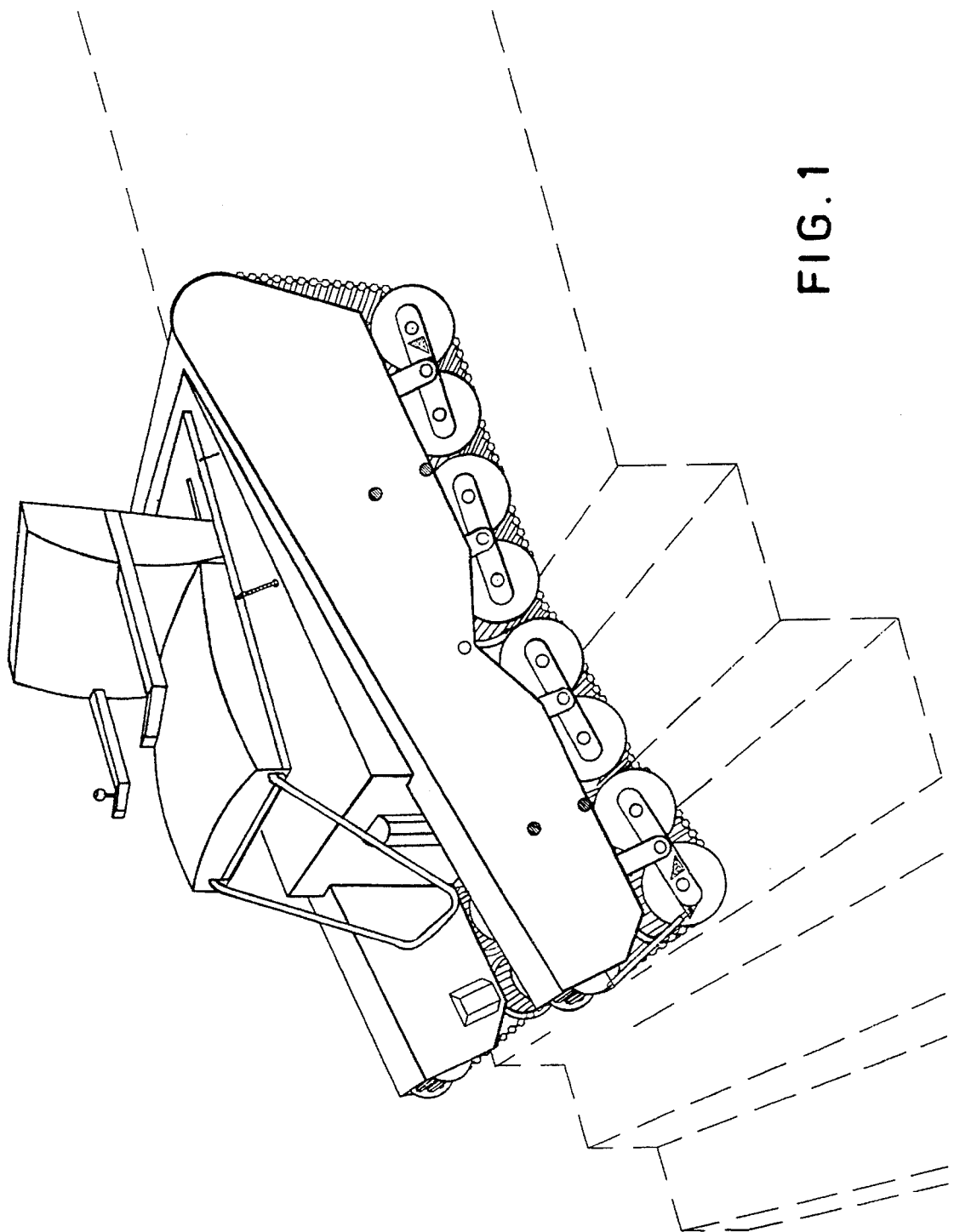
FIG. 1 A three-dimensional view of the stair traversing wheelchair presented in accordance with the invention.

FIG. 1 shows a three dimensional view of the stair climbing device base unit and seat, where the base unit as described hereinafter, is comprised of all components below seat level.

The invention is unlike existing stair climbing contrivances in the composition and operation of the climb mechanism within the base unit and the sensor/logic circuit controlled operation and level and center of gravity maintenance of the occupant seat.

Figure 2:
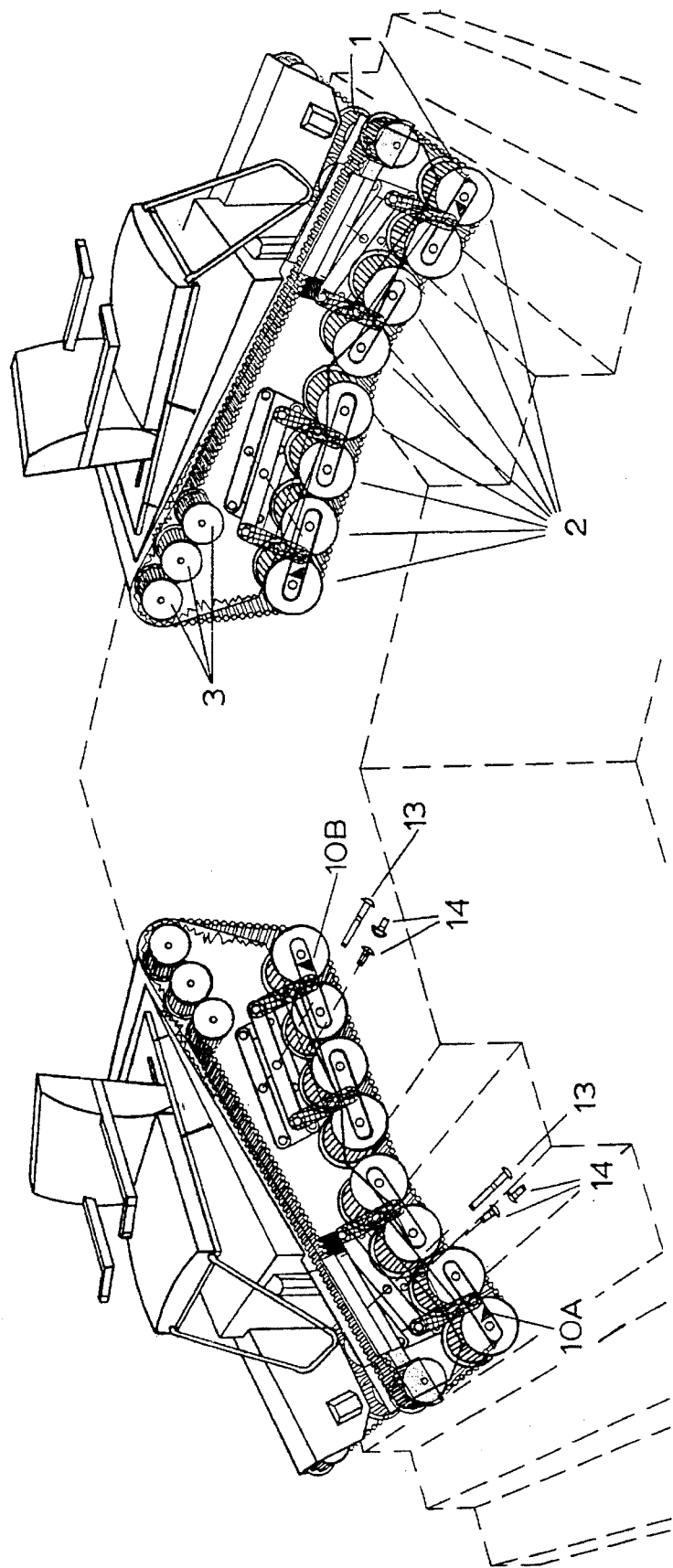
FIG. 2 A dual three dimensional cut-away view of Base Unit showing the base unit frame, truck assemblies, traction drive pulleys, idler pulleys, endless belts, foot rest, and seat.
Figure 3:
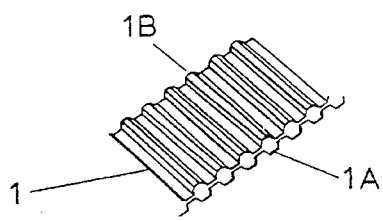
FIG. 3 A magnified section of the endless belt (track).
Figure 7:
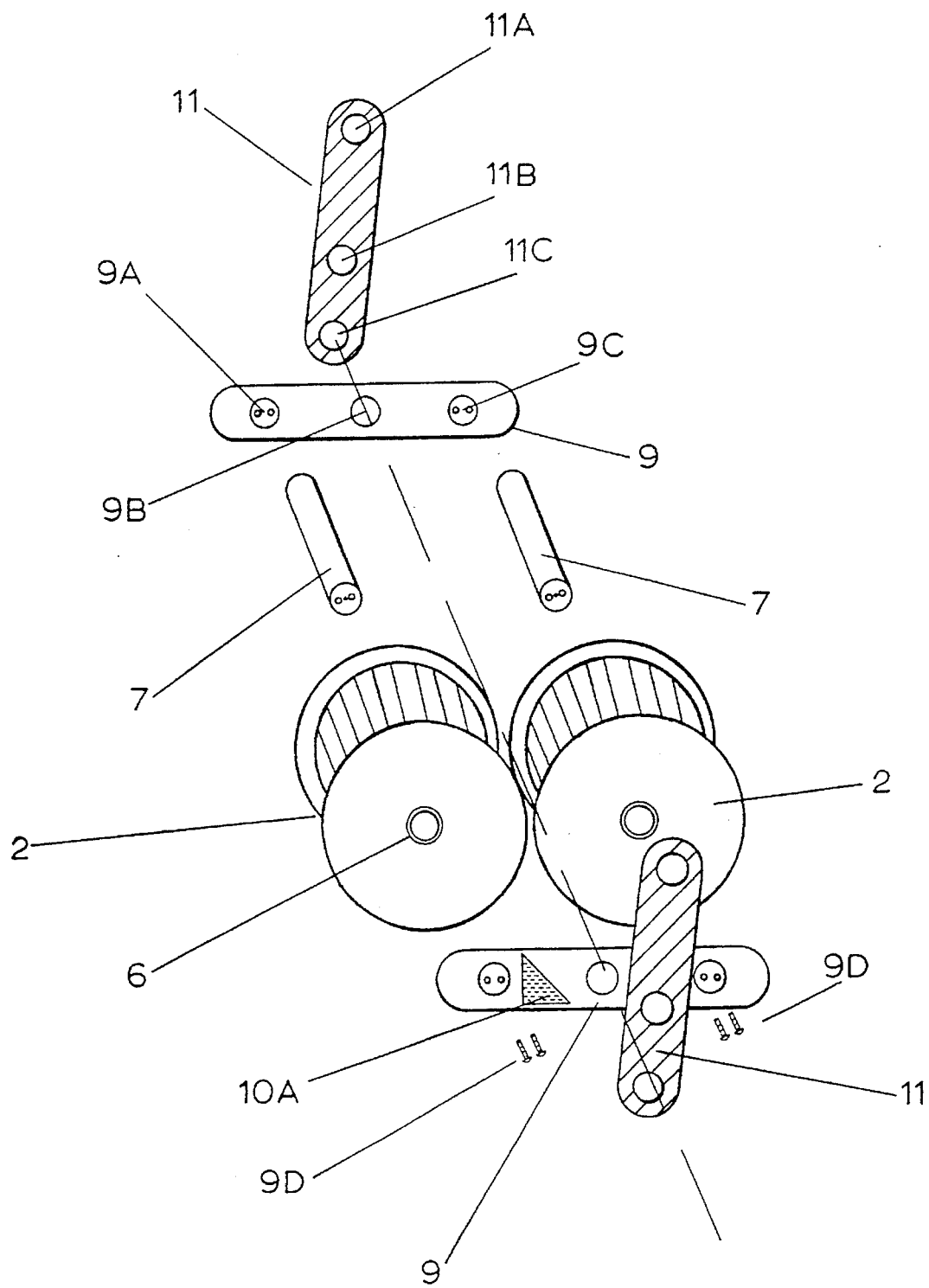
FIG. 7 An exploded view of a truck.
Figure 9:
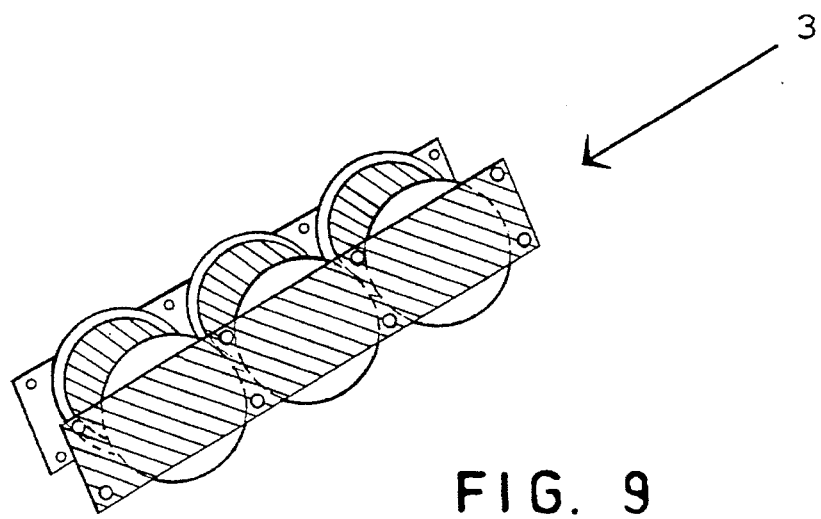
FIG. 9 Shows a three-pulley traction pulley group.

FIG. 2 shows the base unit lower surface is comprised of two endless belts or tracks (1) magnified in FIG. 3 to show it equipped with rubber cleats projecting downward (1A) toward the surface for purposes of providing additional grip on inclined surfaces, and with rubber cleats projecting upward (1B) to engage the wheels (2) and a traction pulley group (3) FIG. 9, both shown on the 3-D view. When the device operates in the track mode, the endless belts are in direct contact with the group and sixteen independently suspended, light weight pulleys or wheels (2) ride along them. Eight wheels aligned in a row per side (shown on the 3-D view) are divided into eight groups of two, called trucks (4), FIG. 4. Two trucks (four wheels) are connected together to form a truck assembly (5), FIGS. 5 and 6. There are two truck assemblies per side and four truck assemblies per base unit. Except for transient loads, base unit gross weight distribution is:

(a) each wheel (2) carries on sixteenth (b) each truck (4) carries one eighth (c) each truck assembly (5) carries one fourth Referencing FIG. 7, Trucks (4) are comprised of five basic components:

Wheels (2) with configurations similar to high torque drive (HTD) pulleys;

Bushings (6); that fit within the Wheels (2);

Axles (7); that fit through the Wheel Bushings and connect to lateral Spars (9) on each end.

Spars (9) with forward (9A), center (9B), and rear (9C) holes, and triangular shaped rotation stops mounted forward on the front spars (10A) and rearward on the rear spars (10B)

Figure 5:
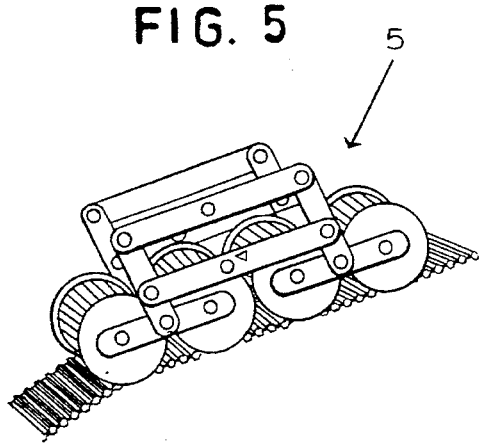
FIG. 5 An assembled Base Unit two-truck truck assembly.
Figure 6:
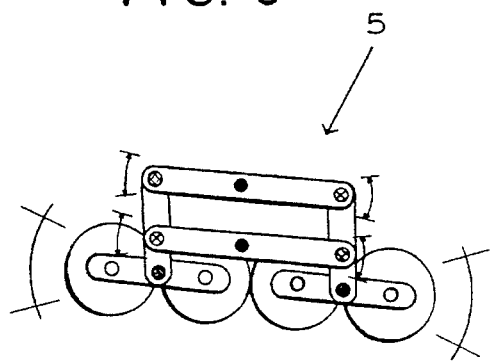
FIG. 6 An assembled Base Unit truck assembly and how it rotates.
Figure 8:
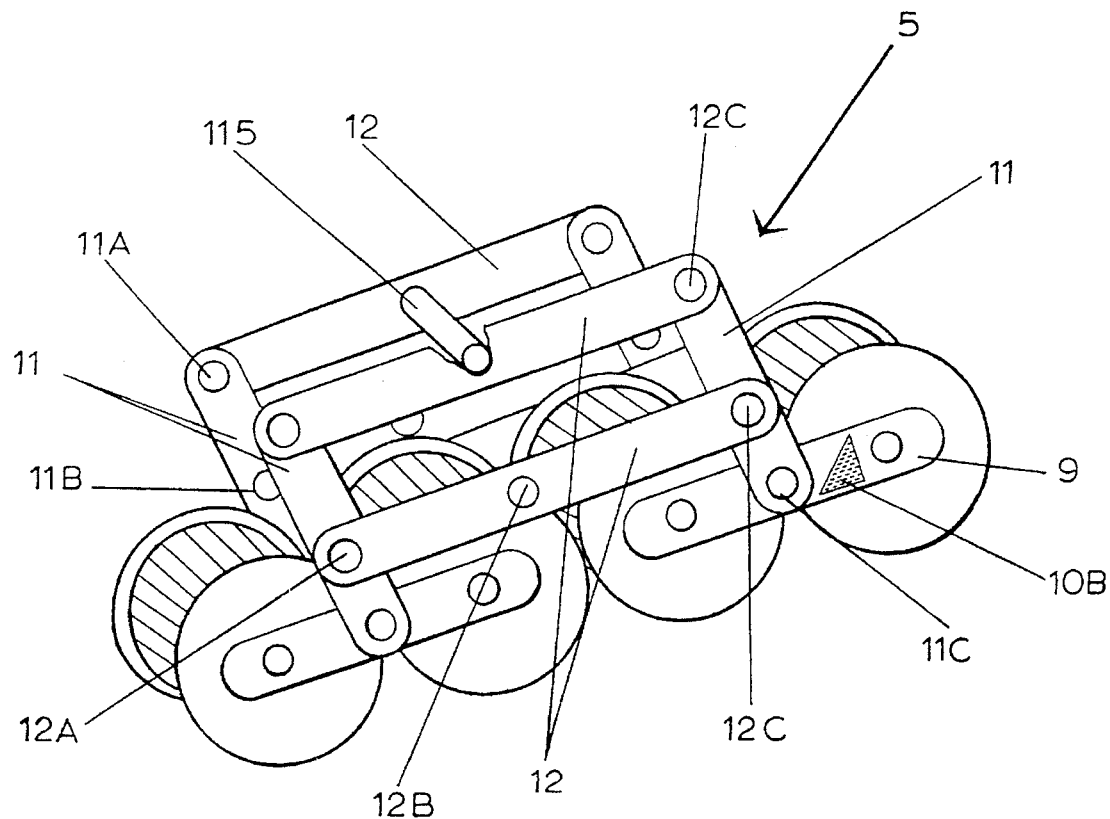
FIG. 8 A magnified view of a truck assembly.

Vertical Stanchions (11) with a top hole (11A), center hole (11B), and a bottom hole (11C);

Truck assemblies (5) FIGS. 5 and 8 are comprised of the five basic components above plus;

Horizontal Crossmembers (12) FIG. 8 with holes forward (12A), center (12B), and rear (12C).

Continuing with FIG. 7, each wheel (2) is made of composite materials, at only a fraction of the weight of a steel HTD pulley, and is equipped with an appropriate bushing (6) and axle (7).

Figure 4:
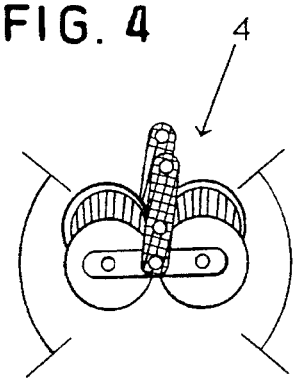
FIG. 4 An assembled Base Unit two-wheeled truck and how it rotates.

The trucks FIGS. 4 and 7 are formed when the axles (7) of a two wheel group are linked to lateral spars (9) on each side. Two ordinary machine screws (9D) are used to connect each axle and spar and prevent axle rotation.

To avoid cluttering the drawings, in most instances, the common clevis pins, fender washers, and "C" clips used to connect and radially hinge the spars (9), stanchions (11), and crossmembers (12), are not shown. The fender washers sever dually as thrust bushings and separators. Axle machine screws (9D) are only shown on FIG. 7.

On the exploded truck view, the lower holes (11C) of vertical stanchions (11) are radially hinged to the center holes (9B) of each spar. The four forward most spars are equipped with triangular stops (10A) that limit the fore-upward rotation of the front trucks to 45 degrees, and the four rearmost truck spars (as illustrated on FIGS. 2, 7, and 8) are equipped with triangular stops (10B) that limit the aft-upward rotation of these trucks to 45 degrees.

The vertical stanchions (11) of a pair of trucks (4) are connected on each side via two crossmembers (12). The top (11A) and intermediate (11B) holes of each stanchion are radially hinged to two lateral crossmembers (12) at points (12A) and (12C), that connect the two trucks forming a truck assembly (5) FIGS. 5, 6, and 8.

Figures 10, 11, 12:
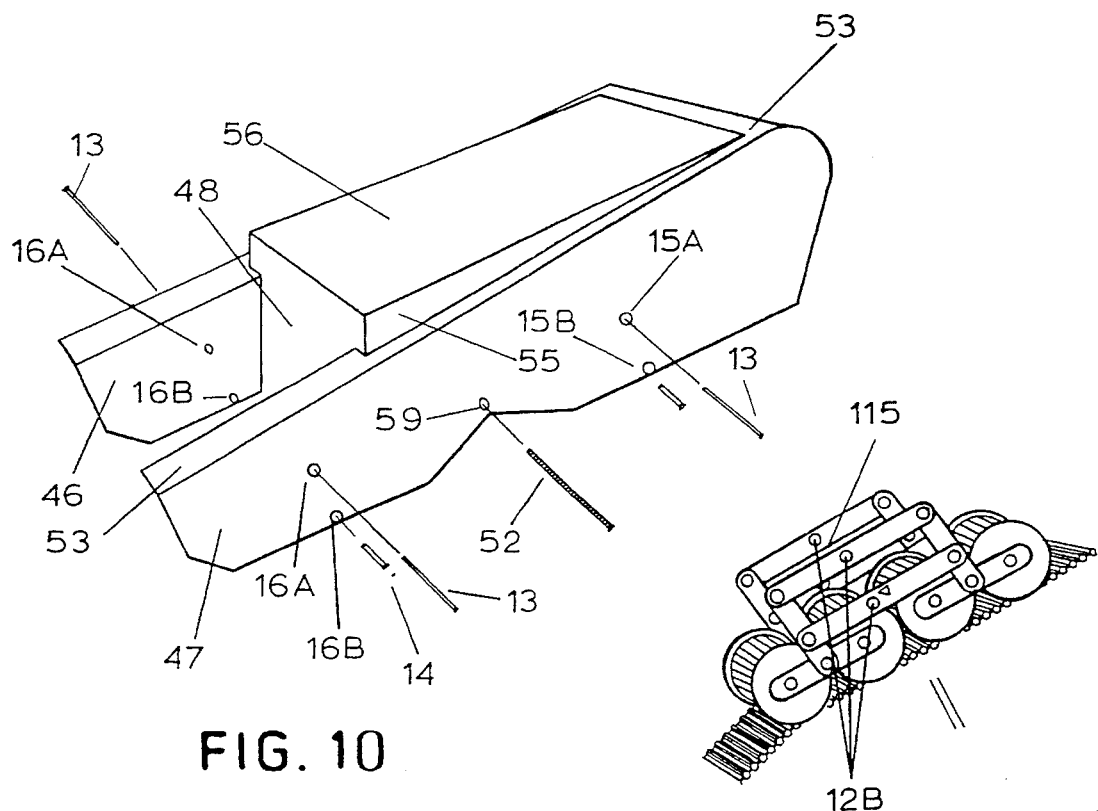
FIG. 10. Presents a 3-D view of the Base Unit frame.
FIG. 11 A 3-D view of a truck assembly exploded from the Base Unit frame.
FIG. 12 Presents a rear view of the Base Unit frame.

Referencing FIGS. 10, 11, and 12, each truck assembly is attached to the base unit frame with truck assembly axles. All truck assembly axle units are comprised of commonly known and used clevis pins (13), spacer washers (13A), separating tubes (115), and "C" clips (13B), that secure the axles in place.

Each of the four upper axles (13) (front, rear, left, and right) traverse the inner (46) and outer (47) walls of the base unit connecting through axle holes (15A or 16A), upper crossmember center holes (12B), and crossmember separating tubes (115) mounting the truck assemblies, while adding rigidity to the base unit.

The lower Truck Assembly axles (14) extend only through a base unit inner or outer wall axle hole (15B or 16B), spacer washers, a lower crossmember center hole (12B), and a "C" clip. If the lower axles extended from outer to inner walls, truck rotation would be obstructed.

The crossmembers rotate laterally about the axis of the axles (13 and 14), lock the four stanchions of a truck assembly in a vertical plane, and maintain a minimum interval between adjacent truck wheels.

The front eight crossmembers are connected similarly except the base unit crossmember axle holes (16A and 16B) shown on FIG. 10, and the crossmember intermediate holes (12B) are moved slightly forward to pre-load (place greater weight on) the front most trucks, disposing them to drop quickly when descending stairs, to establish early weight-bearing contact with the initial steps, as shown on FIGS. 13 through 21. This arrangement: permits the individual wheels of a truck and the individual trucks of an assembly to move diametrically and independently of other trucks and faithfully follow the surface traversed; transmits only a fourth of the impact of any surface variation to the base unit; facilitates the smooth transition of the base unit from level to inclined or declined travel, and fluid stair to stair transit.

Figure 13:
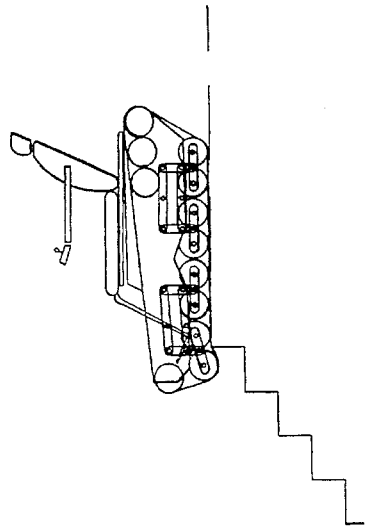
FIGS. 13 through 21 are plan views each showing the progressions of a base unit and seat through a typical descent or ascent, the hinged level maintenance of the cargo platform, the fore and aft movement (center-of-gravity maintenance) of the seat, the independent rotational and reciprocal movements of each truck and each truck assembly, through a stair traverse. Specifically.
Figure 14:
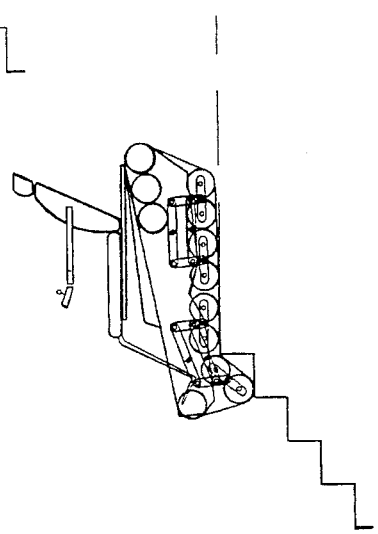
Figure 15:
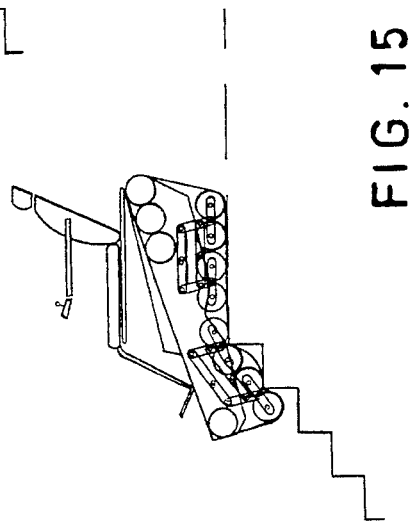
Figure 16:
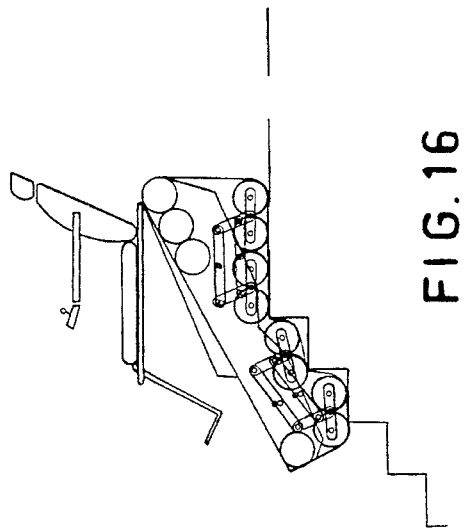
Figure 17:
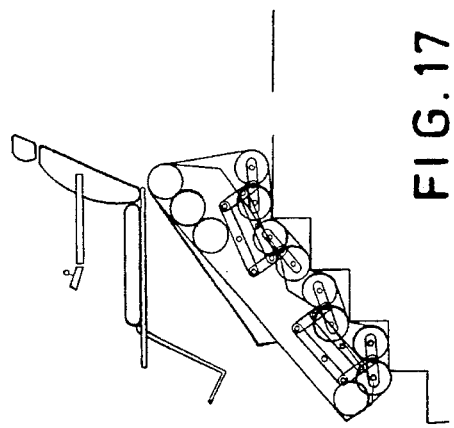
Figure 18:
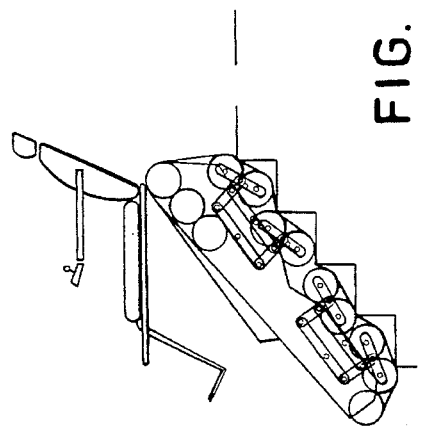
Figure 19:
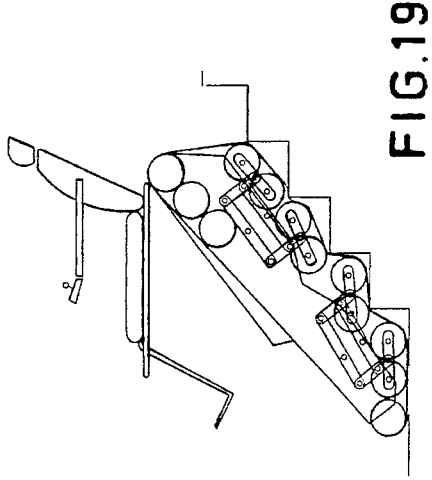
Figure 20:
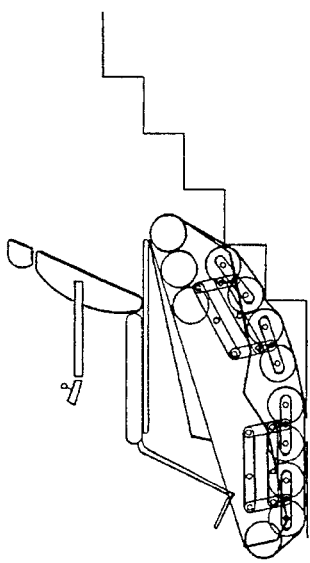
Figure 21:
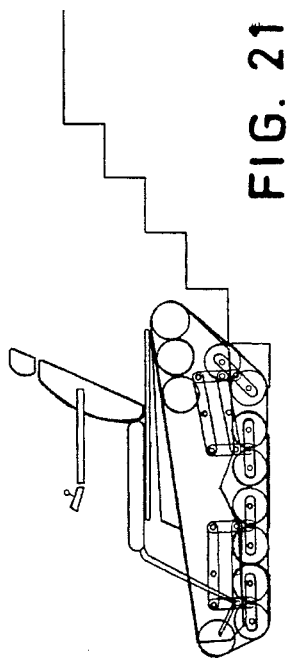

FIGS. 13 through 21 show the progressions of the seat, truck assembly movements, and endless belt deformations through a descent, or if you start with FIGS. 21 through 13, an ascent.

Occupant lurching and the need to slow to a snail's pace to minimize oscillations through a step traverse, a pitch transition, or seat leveling is eliminated.

Figure 22:
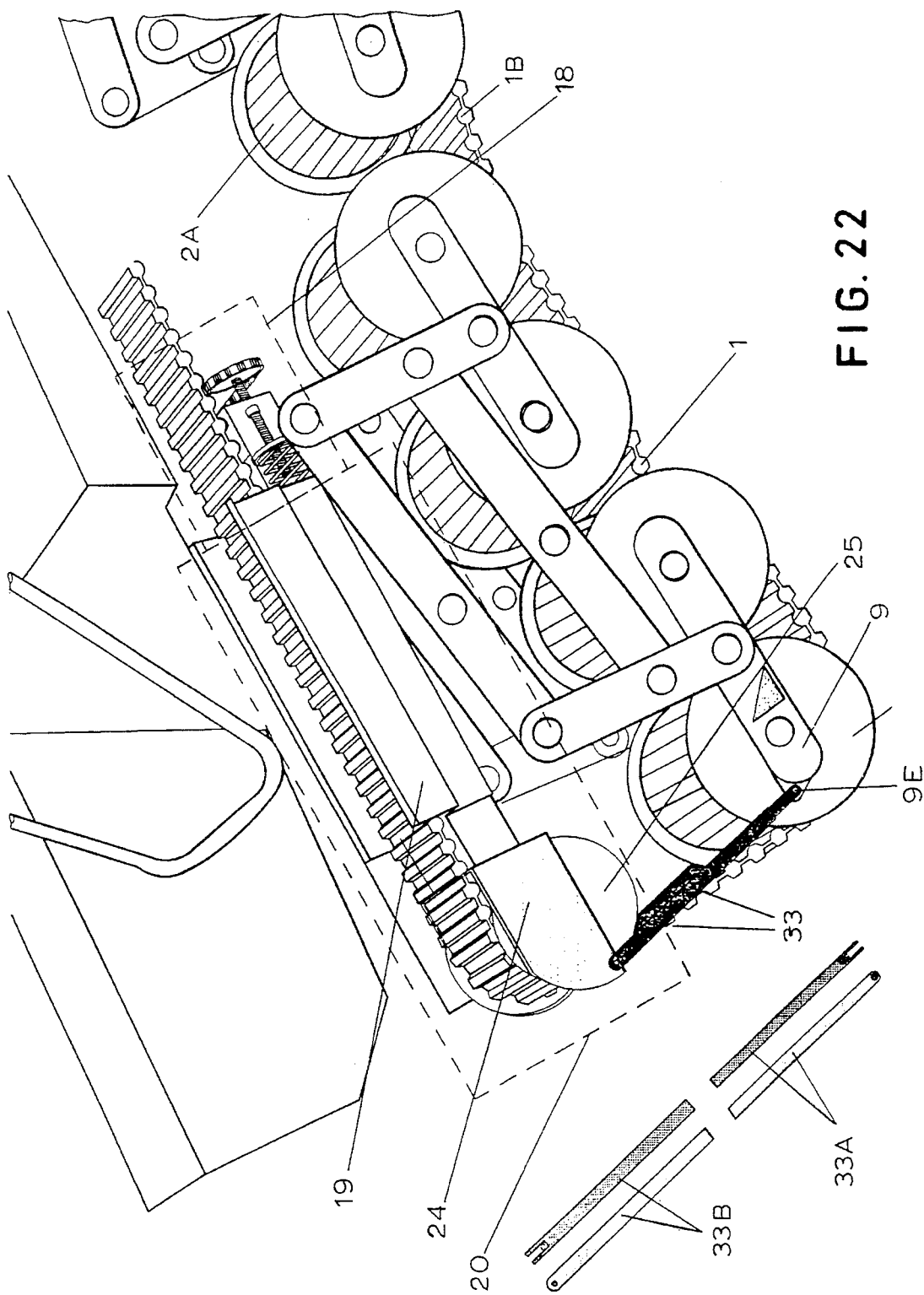
FIG. 22 A cross sectional view of a tension control unit and the telescopic arms.

FIG. 22 shows the association between an assembled upper idler pulley assembly (20), part of an endless belt tension control unit (18), and the telescopic arms (33), that together maintain the appropriate slack on each endless belt.

It also shows where an upper idler pulley assembly mounting bracket (19) is attached to the base unit above a front truck assembly. The bracket (19) holds the upper idler pulley assembly (20), the endless belt tension control unit (18), and allows passage of the endless belt as it transports around the idler pulley (25) and the wheels.

The endless belts (1) have cleats that project upward (1B) to mesh with the wheel (pulley) teeth (2A). The cleats and pulley teeth are perpendicular to the direction of travel, and this cleat-tooth engagement together with the tension maintained on the endless belt, keeps the base unit positively on track.

Telescopic tubes (33) are attached from the lower front side of each "U" fork (24) to the forward uppermost hole (9E) of each front truck spar (9). The lower tube (33A) fits into the upper tube (33B), and each of the two tubes has a drilled clevis at the opposite end through which the attaching clevis pins are installed.

The telescopic tubes maintain:

The proper angle for curb climbing

A minimum interval between the front idler pulleys (25) and the frontmost wheels (34)

Minimum belt tension in various configurations

Since the tubes are telescopic, they allow the front trucks to drop to begin a descent or follow a dip in the terrain.

Figure 25:
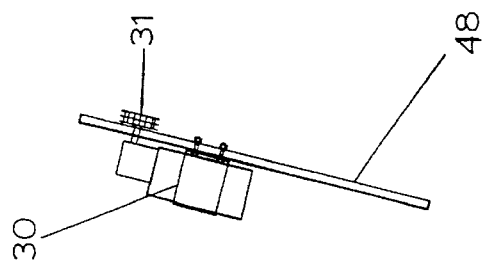
FIG. 25 a side view of the base unit panel, motor, and sprocket that powers the endless belt tension control unit.
Figure 24:
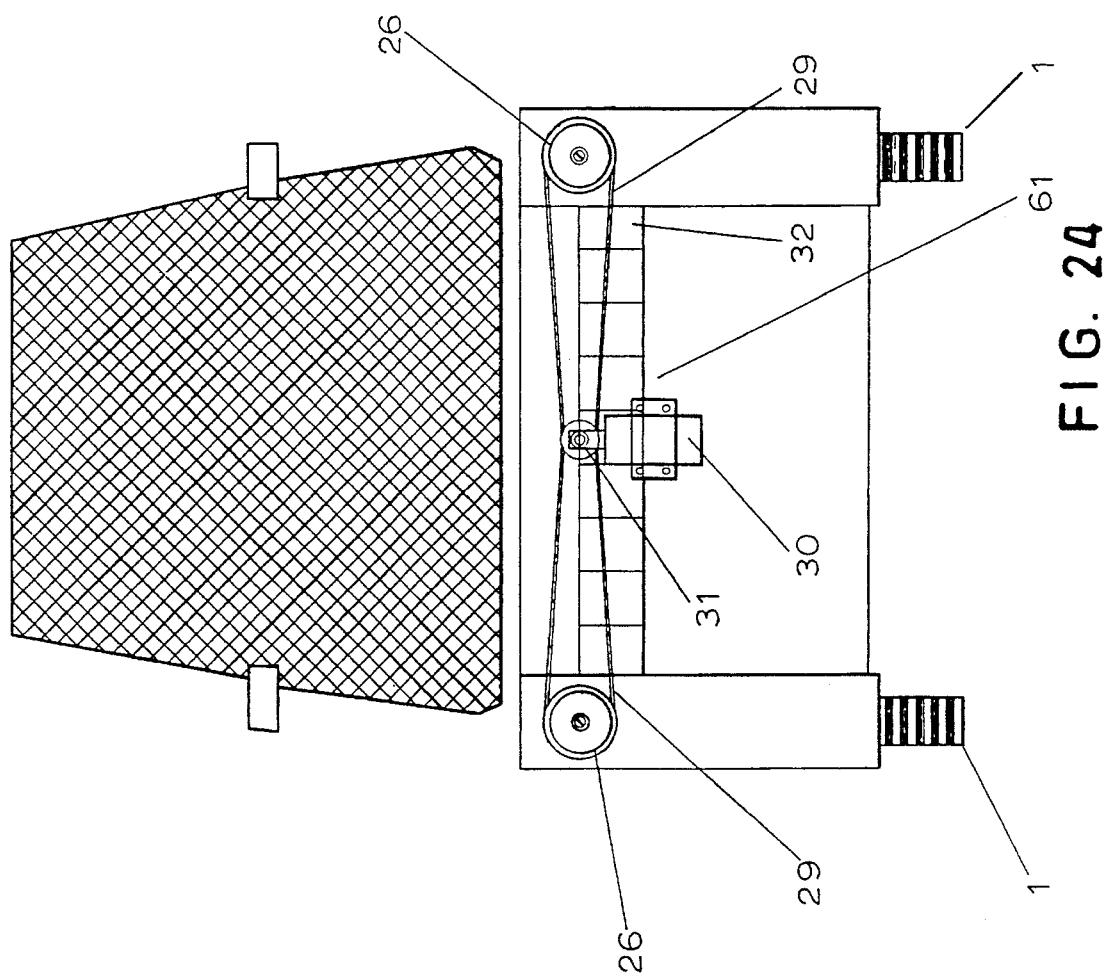
FIG. 24 A rear cross-sectional view of the base unit showing the motor and chain assembly that powers the endless belt tension control unit.

FIG. 23 shows an exploded view of the component parts of the upper idler pulley assembly (20), and parts of the endless belt tension control unit (18), items 22, 26, 27 and 28, while FIGS. 24 and 25 exposes the remaining items 29 through 32, in a rear cross-sectional view of the chair.

Continuing with FIG. 23, the upper idler pulley assembly (20) is comprised of position sensors (20A and 20B), an idler pulley (25), that fits into a "U" shaped fork (24) that is attached to the smaller of two tubings (23). The smaller tubing fits into the larger tubing (21) with a spring (22), placed between the rear end of the smaller tubing and the front of the adjustable threaded backstop nut (27) in the larger tubing. The spring functions to maintain tension on the endless belt, provide transient slack when the truck assemblies deform to the shape of the surfaces (stairs-etc) traversed, and provide pulley shock dampening. The upper idler pulley assembly position sensors (20A and 20B) tell the DC backstop motor when to stop and also send position information to the logic control circuits.

The endless belt tension control units (18) are comprised of springs (22), backstop sprockets (26), threaded backstop nuts (27), threaded shafts (28), thrust washers (28A), "C" clips (28B), and shown on FIG. 24 and 25, drive chains (29), a dual sprocket (31), a reversible DC control motor (30) mounted on panel (48), and a logic control circuit (32).

When the logic circuits recognize a need to change tension on the endless belts, the reversible DC motor (30) rotates the central sprocket (31), the drive chains (29), and backstop sprockets (26).

Returning to FIG. 23, a machine screw retains the backstop sprockets (26) on the square ends of the partially threaded shafts (28). Thrust washers (28A) and "C" clips (28B) in the "C" clip grooves (28D) hold the shaft (28) in place. Non-rotating threaded backstop nuts (27) installed in the large telescopic tubings (21) are subsequently moved back and forth by the rotation of the sprockets (31 and 26), and shafts (28) FIGS. 23, 24, and 25. This movement in turn moves the springs (22), and idler pulley assemblies (20) to increase or decrease tension against the endless belts.

The endless belt tension control units (18) adjust the backstops nuts to:

(a) Increase tension in the endless belts as the unit begins a forward curb climb (b) Maintain a forward sloping angle from the first truck pulleys to the upper idler pulleys to facilitate a forward climb (c) Increase tension in the endless belts as the unit begins a rearward stair climb (d) Initially decrease, then increase slack to commence a forward descent which allows the trucks to more faithfully follow the stairs.

The pitch sensors and logic circuits mounted on the electronics mounting plate (61) FIG. 24 will not allow a rearward descent in excess of eight degrees decline, a rearward ascent beyond thirty-nine degrees, a forward incline in excess of eighteen degrees, or a forward descent in access of forth degrees.

Figure 26:
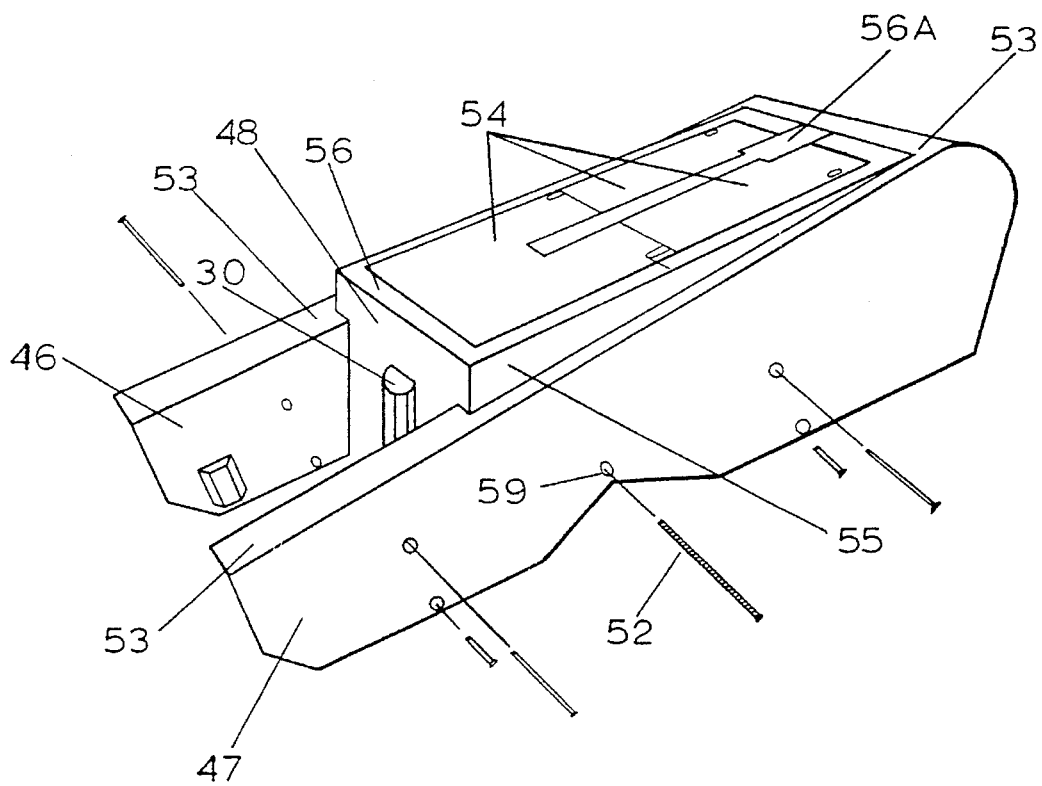
FIG. 26 A three-dimensional view of the Base Unit Frame component parts.
Figure 27:
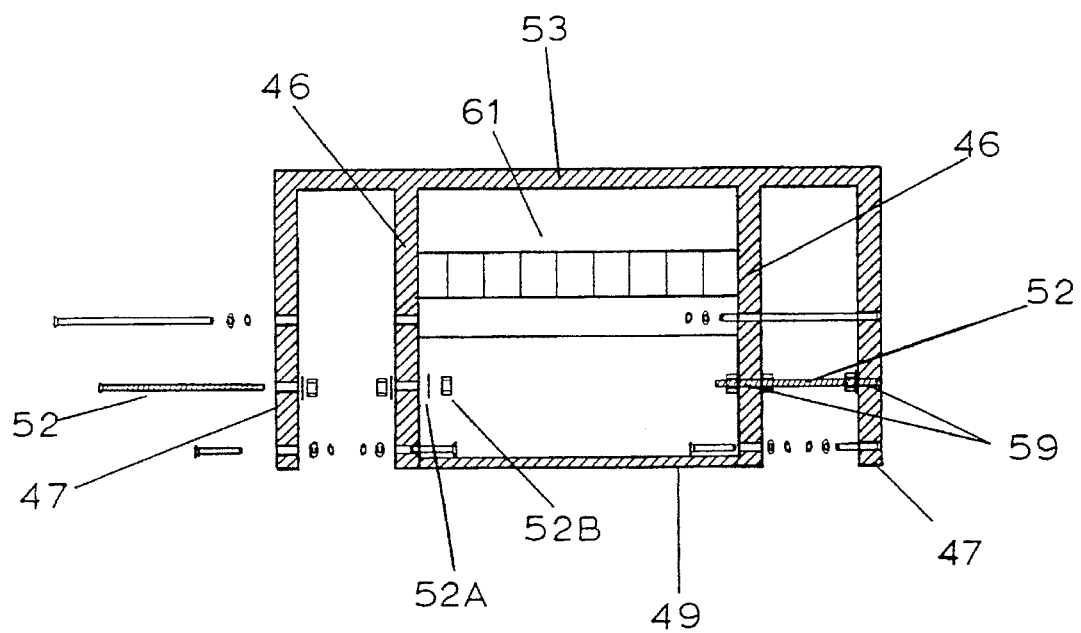
FIG. 27 A rear view of the Base Unit Frame component parts and electronics mounting plate.

FIG. 27 shows in a rear view and FIG. 26 in a 3-D view the frame of the base unit is comprised of two sets of parallel inner (46) and outer (47) side walls that support two truck assemblies per side, a front panel (48) joining the two inner side panels, and base panels (49) that join and follow the lower contours of the two inner side panels.

Traversing between a hole (59) in the lateral middle of each pair of inner and outer walls is a spacing bolt (52) which together with a series of spacer washers (52A) and nuts (52B), maintains the interval between the inner (46) and outer (47) wall panels and also strengthens the base structure.

Figure 28:
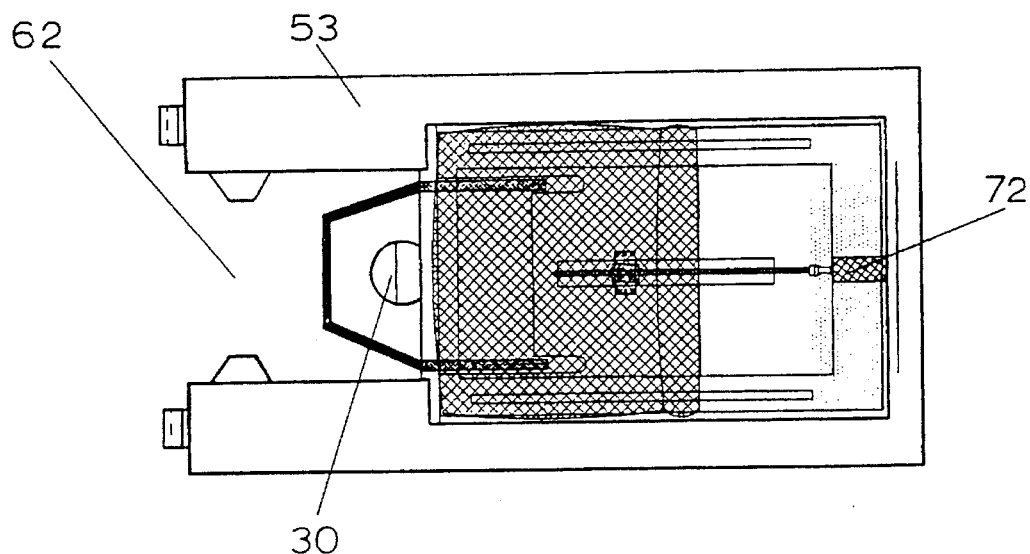
FIG. 28 A top view of the Base Unit Frame component parts.

Illustrated on FIGS. 26, 27, and 28, placed atop and connecting the front panel (48), and inner (46) and outer (47) wall panels, is a sloping horizontal panel (53) that slopes down from the top rear of the base unit to a point a few inches lower in the front. It provides rigidity along the horizontal plane, provides an access opening to the motors, batteries, and various electronic circuits, and structurally supports two wedge-shaped vertical panels (55). The two wedge-shaped vertical panels (55) support a panel (56) that is horizontal to the ground and provides hinged access doors (54) to the motors, batteries, and various electronic circuits. The hinged access doors have cut-outs (56A) to accommodate the horizontal seat positioning ball screw actuator (72). The horizontal panel (56) also supports the cargo platform (57) and the cargo platform hinge (58).

Attached directly behind the base of the front panel (48), and traversing between the base of the two inner wall panels (46) is a bottom panel (49) that follows the lower contours of side panels (46 and 47) from panel (48) to the rear. Bottom panel (49) also supports the weight of the batteries and completes the battery compartment. The compartment holds four or more sealed deep cycle batteries, not shown.

The electronics mounting plate (61) that holds the plug-in printed circuit boards, motor relays, solenoids, terminal strips, sensors, switches, circuit breakers, logic circuits, limiters, etc, traverses the inner wall panels and is installed behind the battery compartment and immediately in front of the traction motors.

Figure 29:
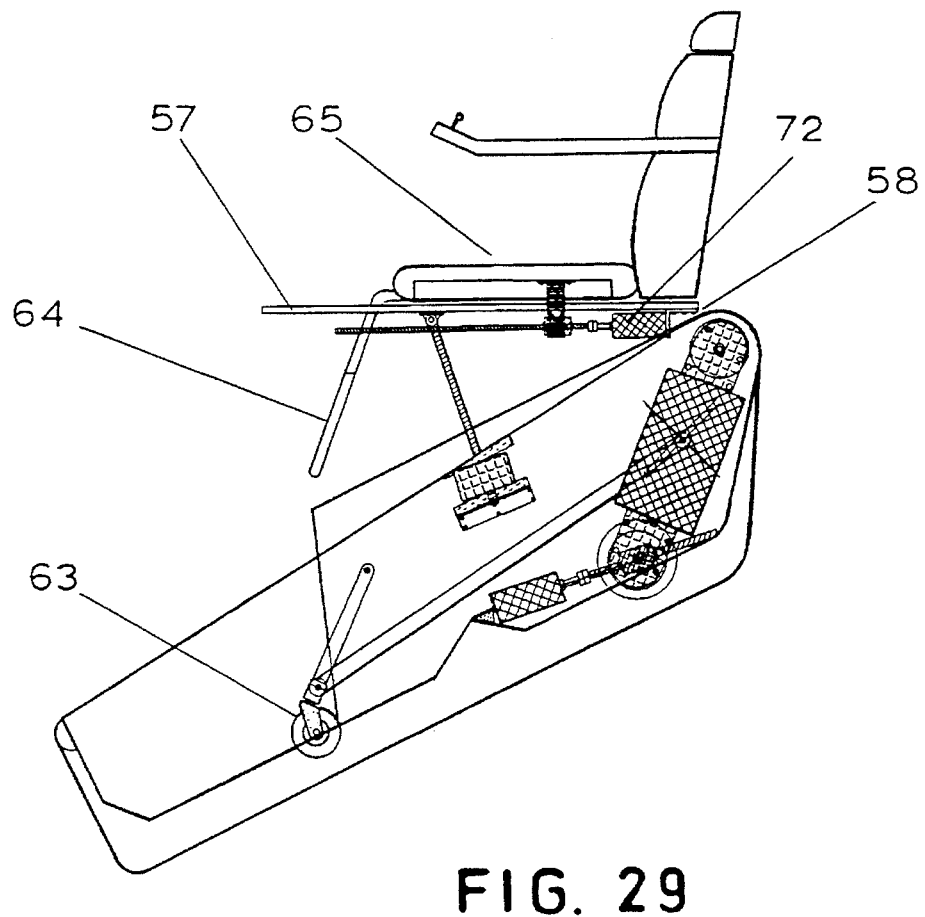
FIG. 29 A side view of the Base Unit Frame component parts.

In front of the front wall (48) of the base unit, is a cavity (62) to receive occupant legs and feet when the base unit is used in the personnel carrying(wheelchair) configuration. It also houses the endless belt tension control unit "backstop motor" (30), the retracted front wheels (63) and the foot rest (64) FIG. 29 that is attached directly to the occupant seat (65) and follows seat movement. This cavity is used to carry additional batteries when the base unit is used in heavy duty applications.

Figure 30:
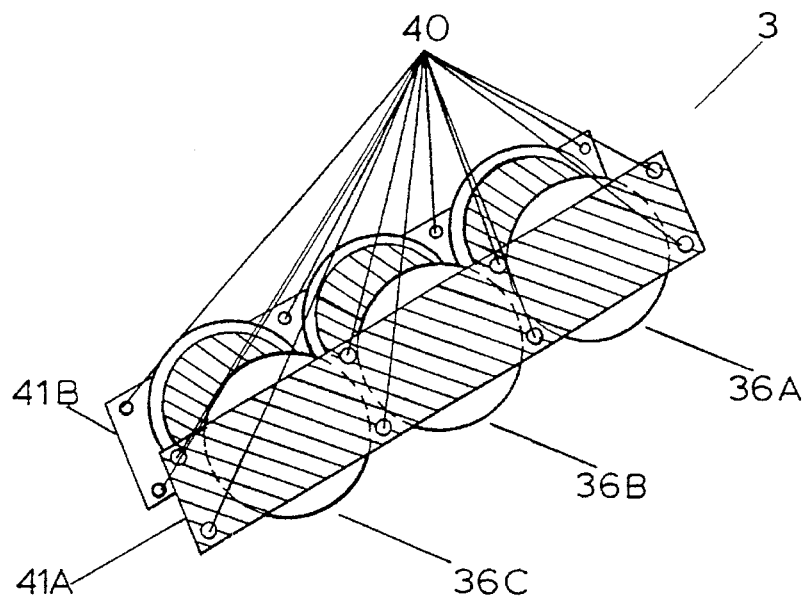
FIG. 30 A three-dimensional view of a three-pulley traction pulley group.
Figure 31:
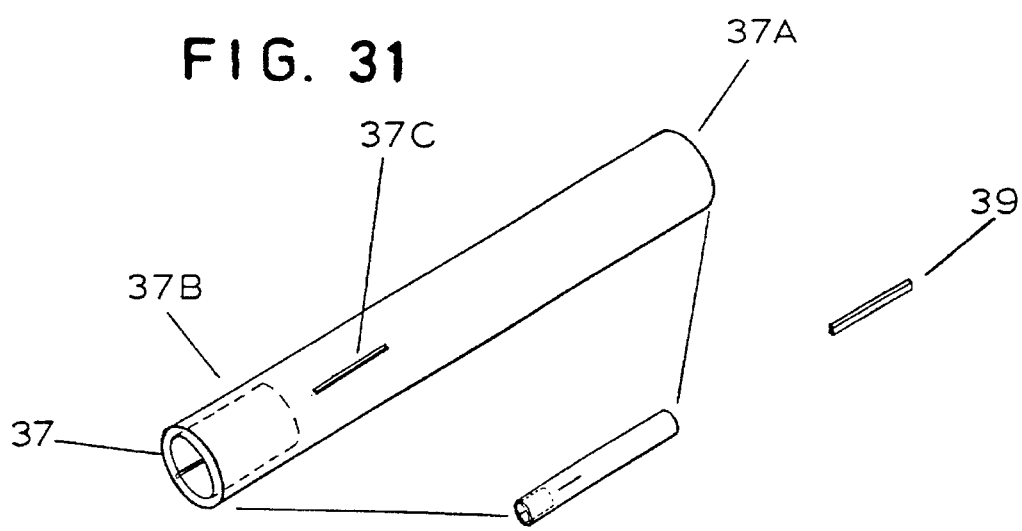
FIG. 31 Drawing and magnified view of combination traction shaft/coupling and keyways.
Figure 32:
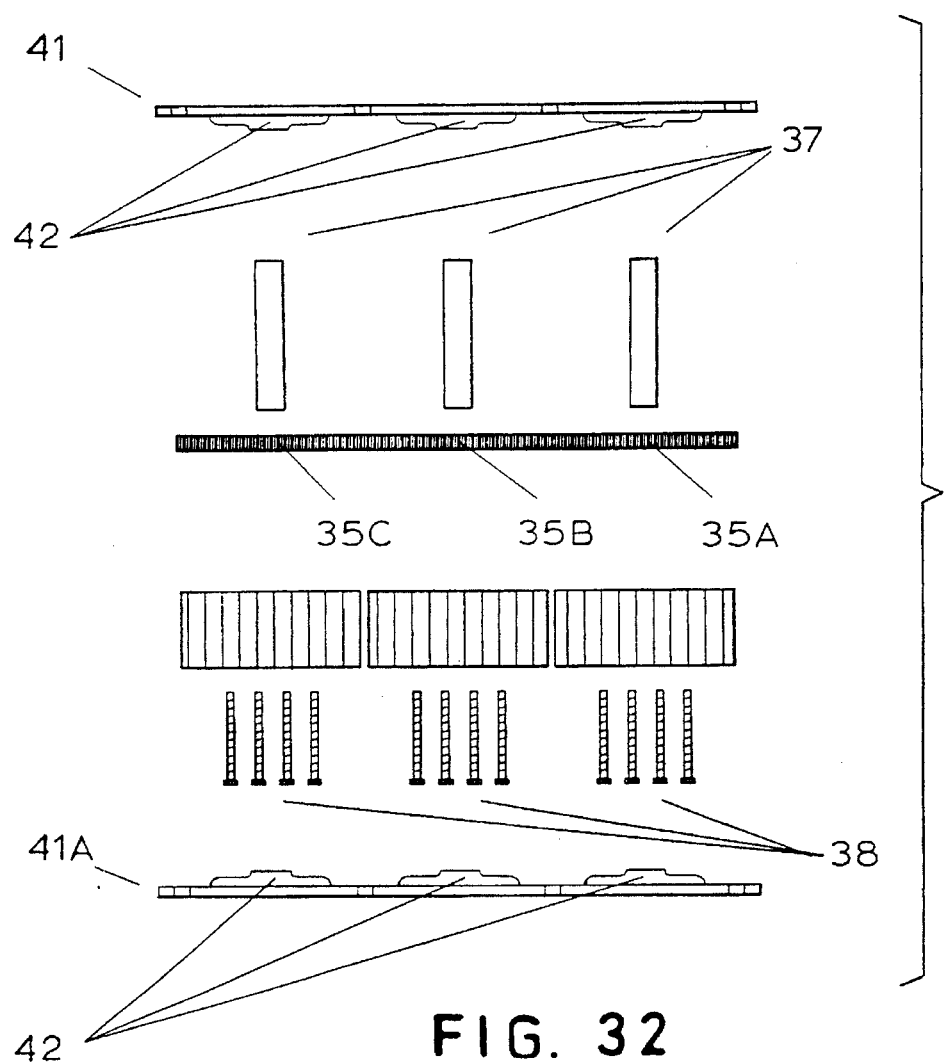
FIG. 32 An exploded traction pulley group.
Figure 33:
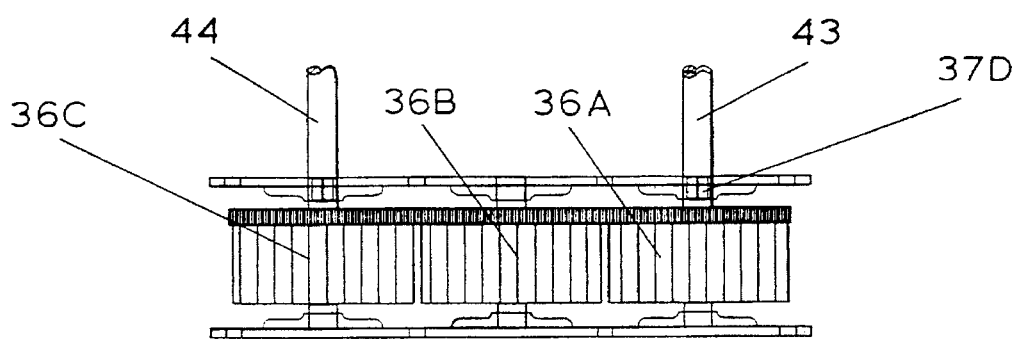
FIG. 33 A top view of an assembled traction pulley group.

FIG. 30, illustrates on of two three-pulley traction drive groups (3) located on each side of the base unit at the upper rear. A traction drive group (3) has a primary traction pulley (36A) and two driven traction pulleys (36B and 36C). Each primary traction pulley (36A) is driven via a dual function pulley and coupling shaft (37) FIG. 31. FIGS. 32 and 33 show the associated driven traction pulleys (36B and 36C)

are driven by metal spur gear (35A) meshing with metal spur gears (35B and 35C) on each of the driven traction pulley shafts (37). Each of the traction pulleys (36A, 36B, and 36C) are made of lightweight composite materials with four pre-drilled holes traversing their width. Each metal spur gear (35A, 35B, and 35C) has four equally spaced threaded holes around a radius, that align with the four holes on a corresponding pulley (36A, 36B, and 36C) through which four threaded bolts (38) traverse and lock the pulley in place. The spur gears also have shaft holes that are cut to receive shaft keys (39) and fit onto the three traction pulley shafts (37). Each end (37A and 37B) of the three traction shafts traversing the cavity between the two endplates (41A and 41B) are held in place by three-bolt flange bushings (42) of the type commonly known and used in machinery with rotating shafts. The traction shaft flange bushings (42) prevent the load of the endless belt being transmitted to the bearings of the reduction gear shaft (43) and centrifugal brake shaft (44).

The reduction gear shafts (43) of the traction motors connect to the keyed coupling (37D) of the traction shafts (37).

The spur gears (35A, 35B, and 35C) distribute the work load to all three traction pulleys (36A, 36B, and 36C) and therefore to a larger area of the endless belt (not shown) as it is drawn over pulley (36A), under pulley (36B), and over pulley (36C) to propel the unit. The pulleys are specifically positioned on the endplates (41A and 41B) in precise proximity to each other to prevent slippage of the endless belt and place the endless belt in maximum arc contact with the pulleys.

Each pair of traction drive group endplates (41A and 41B) are secured in place through the base unit side panels with sixteen quick-connect attachments of the type (Dzus fitting—a slotted flat-head, spring loaded bolt pushed into a mating receptacle and twisted a quarter turn to lock a plate in place ) commonly used on aircraft inspection plates, at points (40), eight per side. This allows the three traction pulleys to be installed as a unit with precise alignment and positioning. This also facilitates each pulley, shaft, bushing, and belt maintenance.

In all applications, a drive shaft (43) FIG. 33 extends at right angles from the reduction gear box of the traction motor, through a hole in the inner wall panel, through a hole in endplate (41B), and connects to the coupling (37D) of the primary traction pulley shaft.

Figure 34:
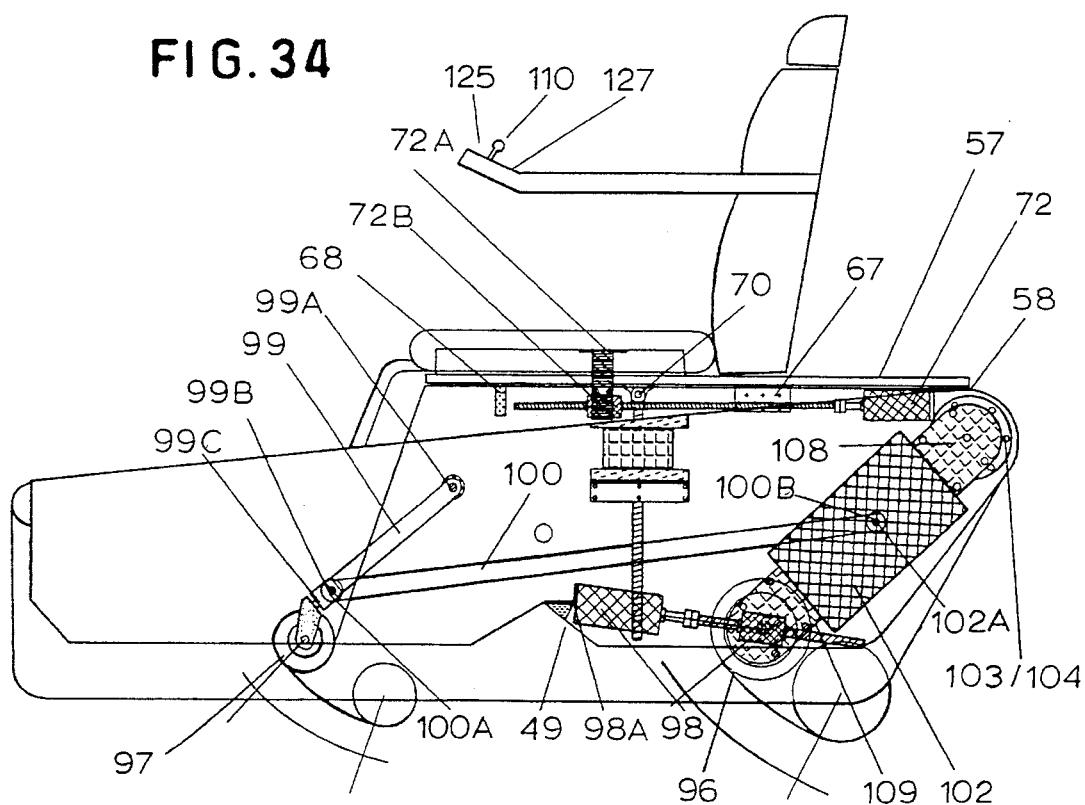
FIG. 34 A side view of Base Unit depicting traction motor, wheels, actuator, and linkage associations.
Figure 35:
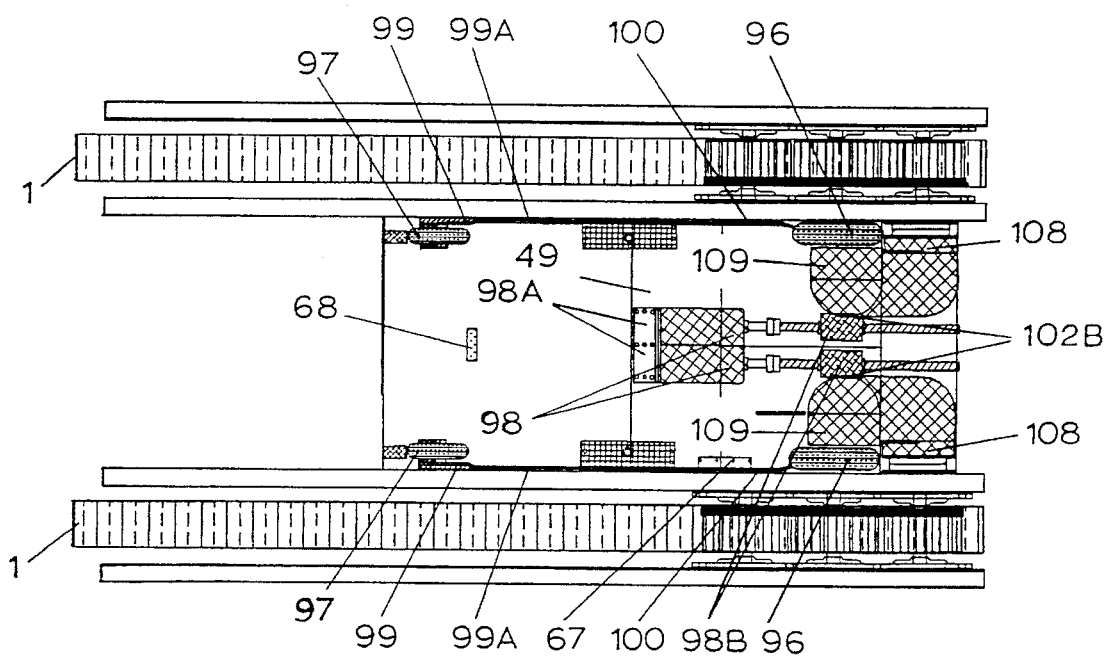
FIG. 35 A bottom view of Base Unit depicting traction motor, wheels, actuator, and linkage associations.
Figure 36:
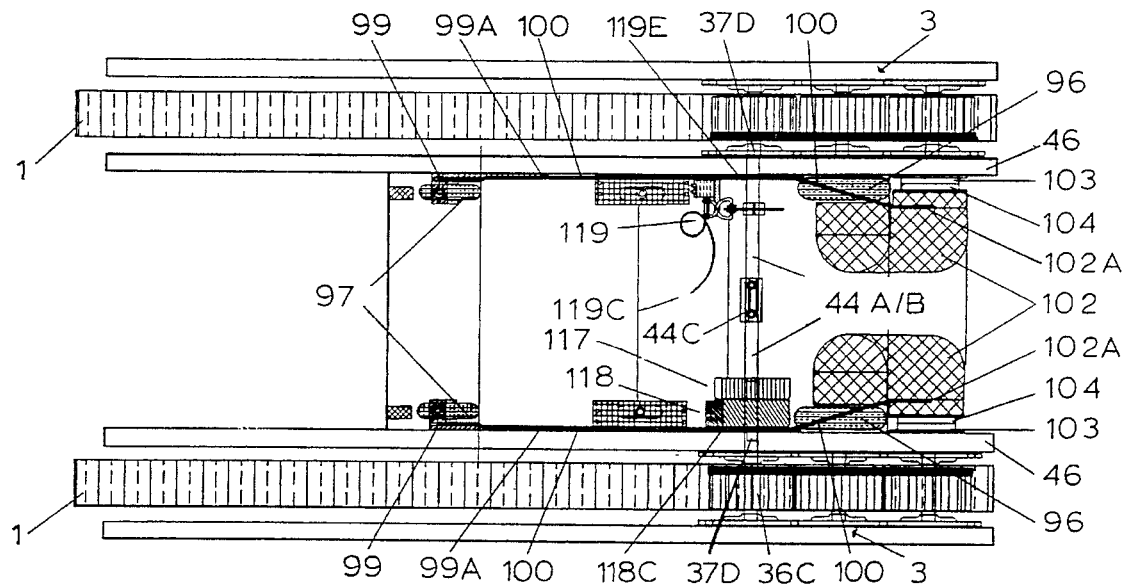
FIG. 36 A top view of Base Unit depicting centrifugal brake, electro-mechanical disc parking brake, traction motor, wheels, and linkage associations.

FIGS. 34, 35 and 36 illustrates stair climbing wheelchair base units equipped with two retractable rear traction wheels (96) for alternate propulsion and two retractable and gimbaling front wheels (97). These base units operate with greater energy efficiency during four wheel operation, because they incur less drag then when operating in the track mode. Whereas both track and four wheel operation are possible on flat surfaces and moderate includes, four wheel operation is recommended for prolonged level transport.

Figure 37:
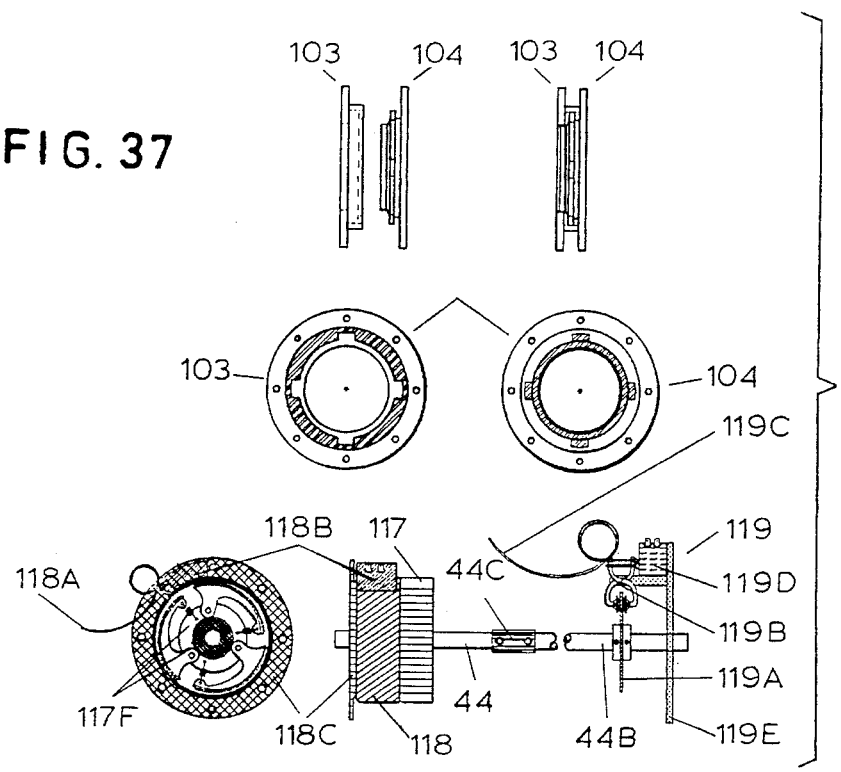
FIG. 37 A view of a radial hinge, an electro-mechanical clutch, the centrifugal brake, and the electro-mechanical disc parking brake.

In light duty configuration, such as wheel chair applications, gear motors are mounted via two-part radial hinges (103 and 104) (also introduced in FIG. 37, to the inner wall panels (46) (See FIGS. 38, 39, and 40 with enlarged views for clarity). Continuing with FIGS. 38, 39, and 40, radial hinge (103) has staggered openings (103D) for the mating lips (103B and 104B) of the two part hinge, to come together.

On the radial hinges of a home-style pressure cooker, the mating lips of the pot and top have a slight angle, therefore when the cooker top is rotated and the lips slip beneath each other, mating lip pressure increases and the lips lock.

The radial hinges (103 and 104) that mount the motors function similarly except:

There is no angle to the mating surfaces; thus

There is no mating surface pressure increase as the traction motors are rotated 90 degrees;

One half of the assembly (103) is attached to the inner wall panel, and the other half (104) to the traction motor reduction gear facing (108).

Returning to the side view of FIG. 34, the traction motors also have reduction gears (109) at the lower ends with traction wheels (96) attached.

The radial hinges (103 and 104) motor mounting permits one traction motor (102) per side, to power both track and wheel operations. When the traction motors are rotated at the hinge, the traction wheels (96) used to propel the base unit are lowered to the ground in tandem with the linked front gimbaling wheels (98), and the endless belts (1) are elevated.

From the operator control console (125) of the base unit, the operator directs four wheel or endless belt (track) operation. A Wheel/Track switch (127) on the operator control console (12) operates each of the two DC motor driven ball screw actuators (98), one per side. The side FIG. 34 and bottom view FIG. 35 shows the frames of the ball screw actuators (98) are hinge mounted (98A) to lower panel (49) of the base unit, while the ball slides (98B) of the screw shafts are connected to the lower ends (102B) of the radially mounted traction motors (102). Each actuator simultaneously extends or retracts one rear wheel (96) and one linked (97) front wheel.

The two ball screw actuators (98) operated together raise the base unit off the endless belts by lowering the wheels, and lowers the base unit onto the tracks for transport by raising the wheels.

The pivoting wheel mount arms (99) are mounted with radial hinges (99A) to the base unit inner wall panels (46). The hinges are smaller, but identical to radial hinges (103) and (104) (see FIG. 37). The radial hinges provide excellent weight distribution, facilitate pivoting the wheels up and down, and permit easy wheel mount arm removal for maintenance. A gimbaling front wheel (97) is attached to the bottom (99C) of each wheel mount arm (99).

Lateral link bars (100) connect hinge points (100A) to (99B) of the wheel mount arms (99), and connect link hinge points (100B) to DC motor (102) middle connector (102A), linking the front and rear wheels. When the rear traction wheels are lowered or raised, so are the front gimbaling wheels.

A lightweight centrifugal brake (117) FIGS, 36 and 37 (shown enlarged for detail on FIG. 41), is used to control the speed of the base unit during a descent. The centrifugal brake has multiple brake shoes (117A) that are radially hinged (117C) on a hub while the opposite end of the shoes are spring (117B) loaded in a fashion that permits the brake shoes to fly outward as the shaft spins and engage (drag against the interior of) the fixed brake drum (117D). The drag action is controlled by the strength of the springs and the speed of rotation. Weaker springs set lower speeds and stronger springs permit higher speeds.

As the chair descends stairs and shaft rotation speed increases, brake shoe drag increases limiting shaft rotation speed and base unit speed alike.

Figure 41:
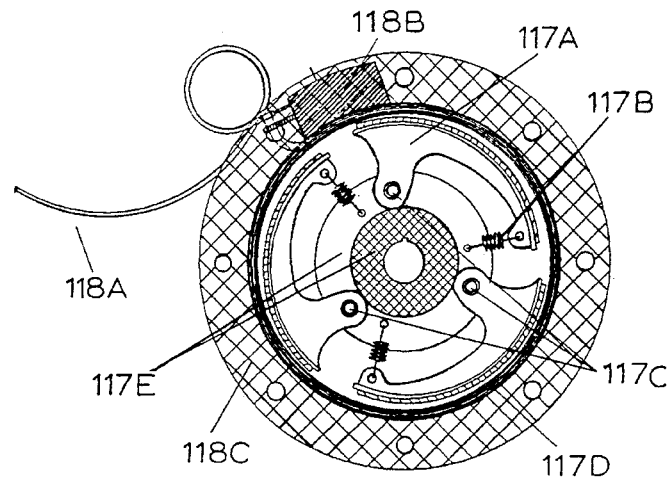
FIG. 41 An enlarged view of an electro-mechanical clutch and the centrifugal brake.

Continuing with FIGS. 36, 37, and 41, a combination servo motor (118B) and cable (118A) operated electro-mechanical clutch (118) very common in the state of the art, engages the centrifugal brake to the shafts attached to the traction pulley groups. As shown on FIG. 36 top view, the mounting plate (118C) of the centrifugal brake (117) and clutch (118) is attached to the left inner wall panel of the base unit. Shafts (44A and 44B) are connected from a traction pulley shaft coupling (37D) on each side of the base unit, through the respective endplates and inner wall panels, through the center of the centrifugal brake (117) and electromechanical clutch assembly (118), a coupling (44C), and the center of the disc parking brake (119).

Figure 51:
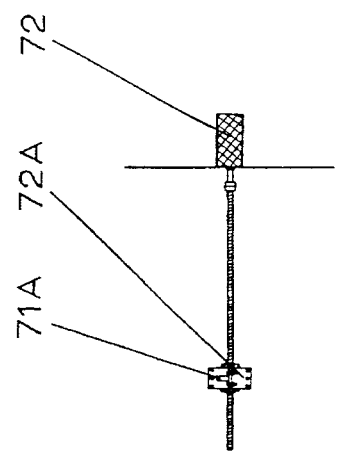
FIG. 51 Seat horizontal positioning actuator components and horizontal position sensor magnet.

The pitch sensor (67), mounted on the base unit (shown on the side view FIG. 34), electrically engages the clutch when the unit is on an incline of 15 degrees or more. The clutch (shown on FIGS. 36, 37, and 51), alternately can be engaged manually by cable (118A) from the operator control console (125) without battery power usage. The clutch connects the centrifugal brake directly to both traction pulley groups (3) and limits endless belt (vehicle) speed to present maximums.

The base unit is an ideal emergency escape vehicle in high-rise buildings since:

The clutch consumes no power in functioning, only to change the state of engagement (engaged or disengaged), but not to maintain that state The centrifugal brake also requires no power during a descent The traction motors generate and feed power back into the batteries during a descent Climb power consumption is not impacted since climb speed never reaches centrifugal brake shoe engagement levels.

Figure 42:
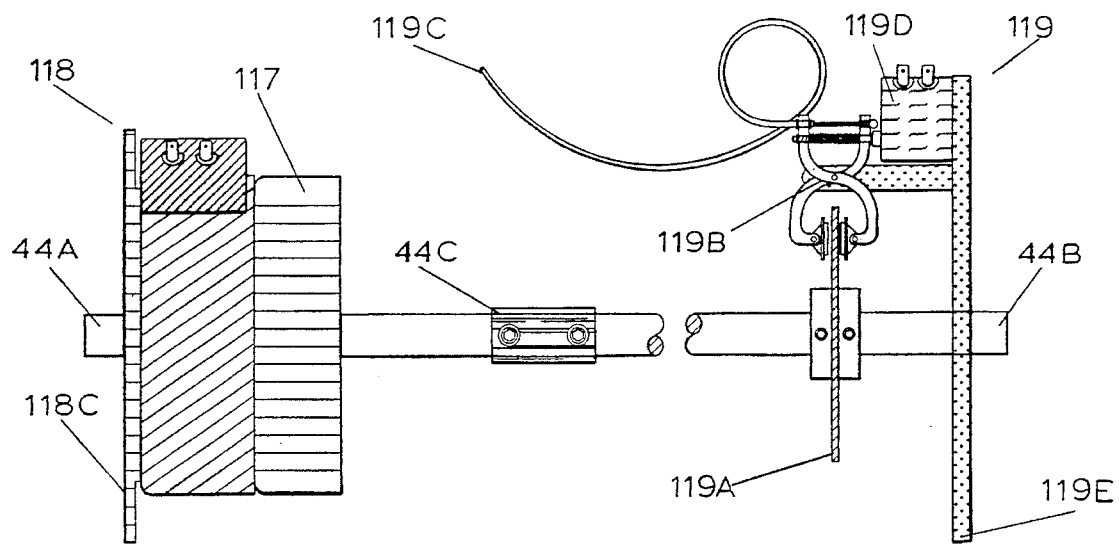
FIG. 42 An enlarged view of the electro-mechanical disc parking brake.

The top view FIG. 36, shows the disc parking brake (119) is mounted (119E) on the right inner wall panel (46) of the base unit. Shown on the FIGS. 36, 37, and 42, views of the parking disc brake, the rotor (119A) is mounted on shaft (44B), connected by coupling (44C), and shaft (44A) to the centrifugal brake and clutch assembly. The brake has a single caliper (119B) that functions identically to bicycle disc brakes, and can be operated manually by cable (119C) or electrically by switch from the operator control console (125) (shown on FIG. 34). A reversible DC motor (119D) (shown on FIGS. 37 and 42) with a threaded shaft is attached to the parking brake mounting plate (119E). The threaded motor shaft is engaged into a threaded caliper arm. When the switch is used, rotation of the motor shaft pulls or pushes one caliper arm depending on the direction of rotation, while the other arm is held stationary. The caliper applies pressure to the disc pad which in turn grips the rotor (119A) stopping shaft rotation, and the vehicle stops. The vehicle can be held in place on an incline, indefinitely with no additional expenditure of battery power.

Figure 45:
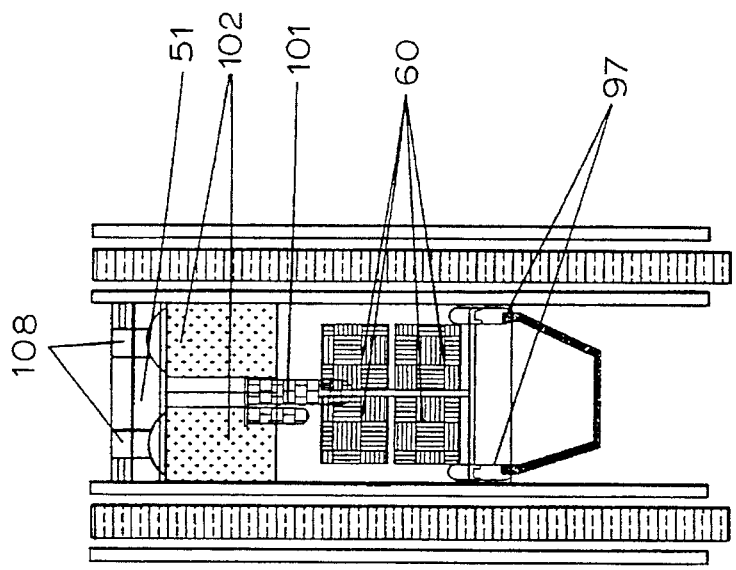
FIG. 45 A bottom frame view details the batteries, motors, wheel actuator, and wheels in a heavy duty application.
Figure 44:
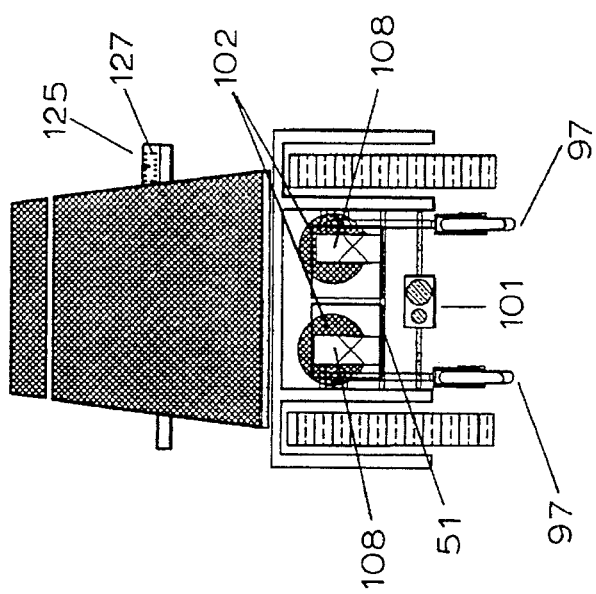
FIG. 44 A rear frame view details the motors, wheel actuator, and wheels in a heavy duty applications.
Figure 43:
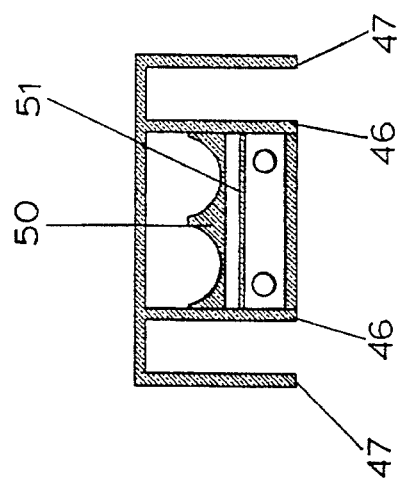
FIG. 43 A rear frame view details frame walls and motor mounts in a heavy duty applications.

FIGS. 43, 44, and 45 present the two wheel design for heavy duty applications in which two fixed motor mount panels (50 and 51) shown on the rear frame view FIG. 43, traverse the base unit towards the rear to join the two inner wall panels (46). The forward motor mount (50) supports the motor armature ends and is cut with two semi-circles that follow the contours of the two motors in a side-by-side configuration. The second motor mount panel (51) is installed in a position horizontal to the ground and beneath the reduction gear ends (108) of the traction motors (102( as shown on the base unit rear view FIG. 44. Bolts through this panel to the reduction gears lock the motors in place.

A single motor driven ball screw actuator (101) FIG. 45, controlled from the control panel console (125), raises and lowers both front wheels (97)simultaneously. Wheel height adjustments elevate the front of the base unit solely to increase maneuverability on various surfaces by decreasing the endless belt surface area in contact with the ground.

In FIGS. 46 and 47, ball screw actuators (66) extend and retract to lift or lower the cargo platform (57), to maintain a pitch perpendicular to gravity (124) FIG. 48, regardless of base unit (116) pitch (base unit inclined view). In all applications, dampened pitch sensor (67) mounted beneath the cargo platform (57), detects variations in the attitude of the base unit (116) and automatically adjust the cargo platform (57) along the pitch axis to maintain a position perpendicular to the earth's gravity (124). Pitch sensor dampening prevents signals being sent to the cargo platform actuator (66) with each transient terrain variation, causing unnecessary battery drain.

Outputs from the cargo platform pitch sensor (67) will stop or limit maximum forward or reverse speeds to one and a half inches per second as cargo platform actuators (66) located on each side of the base unit, make adjustments to maintain the cargo platform (57) in a perpendicular-to-gravity (124) position.

Figure 49:
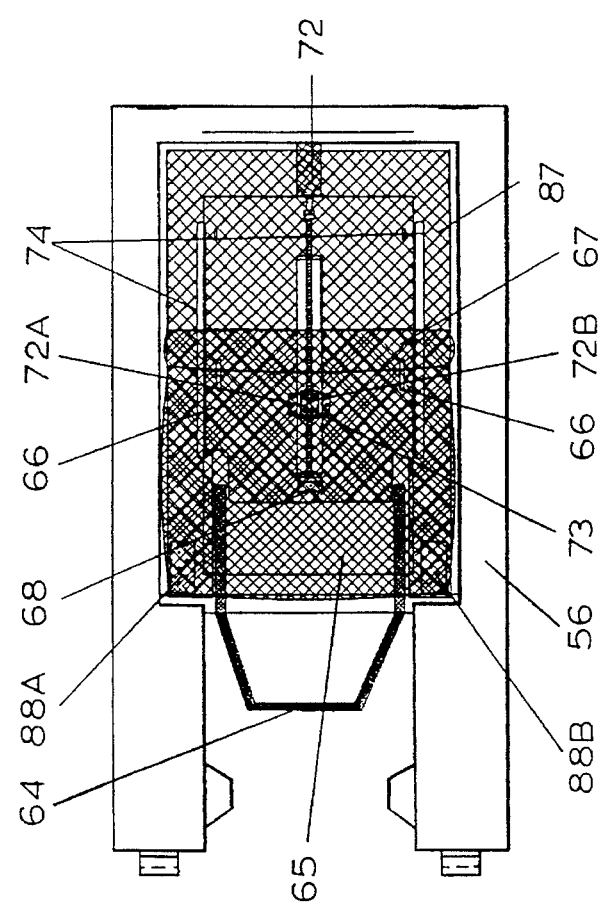
FIG. 49 Top Base Unit view showing pitch and horizontal positioning actuators and sensors.

Viewing FIGS. 46, 47, and 49, outputs from base unit pitch sensor (88A) and cargo platform roll sensor (68) indirectly control the traction motors (102) to limit overall climb speed to one-fourth mile per hour. Base unit pitch sensor (88B) and cargo platform roll sensor (68) limit overall descent speed to one-half miler per hour by engaging the electro-mechanical clutch that engages the centrifugal speed brake.

Seat pitch, center of gravity maintenance (see FIGS. 62 though 61), and speed reduction adjustments are made quickly and transparently by logic control circuits eliminating the need before each stair descent or ascent to stop the base unit to tilt the seat back to what may be perceived by some as an awkward position, along with the attendant danger of the temporarily aft-displaced center of gravity.

Continuing FIGS. 46, 47 and 49, the frames of the ball screw actuators (66) that raise and lower the cargo platform (57) and seat (65), are attached to the inner wall panels with a rubber mount (69) that allows the seat actuator (66) to rotate along the "Y" axis (vertical plane) as the cargo panel is lifted and lowered.

The shafts of ball screw actuators (66) extend upwards and attach to the bottom of the cargo platform (57) utilizing a two bolt single pin clevis-type hinged attachment (70). The attachments are located on each side just forward of the middle of the cargo platform (57).

The foot rest (64) is made of 1½" tubular composite material formed into a modified "U" shape. Each end is flattened, angled approximately 60 degrees, and has three mounting holes at each end. Six bolts attach the foot rest to the base of the seat (65). Slide channels (74) on the left and right sides beneath the seat, attach the seat (65) to the cargo platform (57). Heavy duty applications would require a ball slide table.

The angular position of the cargo platform to the base unit is identified by the cargo platform/base unit proximity sensor (87), which is comprised of an array of sealed magnet actuated proximity switches mounted on the inner wall panel. A link connects from the slide of the proximity switch array to a standard two bolt clevis (70) on the bottom rear of the cargo platform. As the cargo platform is raised or lowered, a magnet at the end of the link moves along the proximity sensor array (87) to actuate the sensors sequentially.

Figure 50:
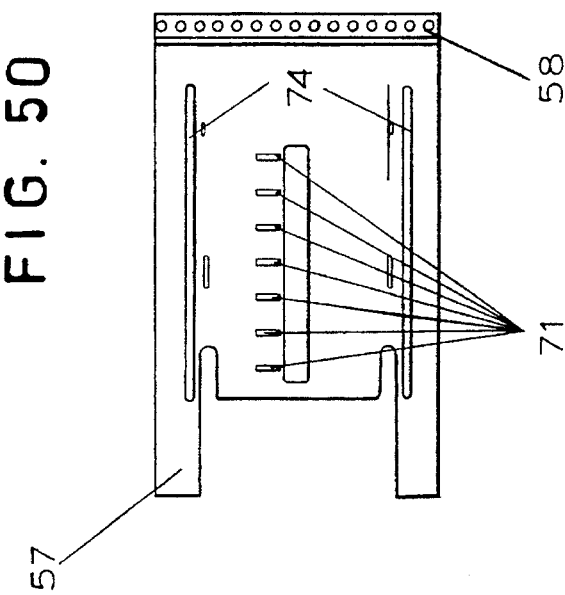
FIG. 50 Top view of "cargo platform" showing horizontal position sensors.

The seat horizontal position sensors (71) FIG. 50, are comprised of an array of sealed magnetic reed proximity switches mounted on the cargo platform (57). A magnet (71A) FIG. 51 mounted on seat attachment (72A) of the ball slide (72B) (also shown on FIG. 46), actuates the switches (71) as the seat is moved, to communicate seat position.

The fore-aft positioning of the seat FIGS. 46 through 51, is performed by ball screw actuator (72) that is connected beneath the lower rear (73) of the seat and the cargo platform (57), but controlled by the cargo platform/base unit proximity sensor (87) and the seat horizontal position sensors (71) FIG. 50.

As the seat is raised or lowered to maintain a pitch perpendicular to gravity (124), the seat (65) is immediately repositioned by the cargo platform/base unit and horizontal position sensors to maintain the optimum center of gravity relative to the pitch of the base unit (116).

Referencing FIGS. 52 through 61, when the base unit performs a descent or ascent, the cargo platform is automatically adjusted to remain perpendicular to gravity (level). The seat (75) is automatically shifted forward and rearward to remain within the center of gravity of the base unit throughout the maneuver, regardless of base unit pitch.

Figure 54:
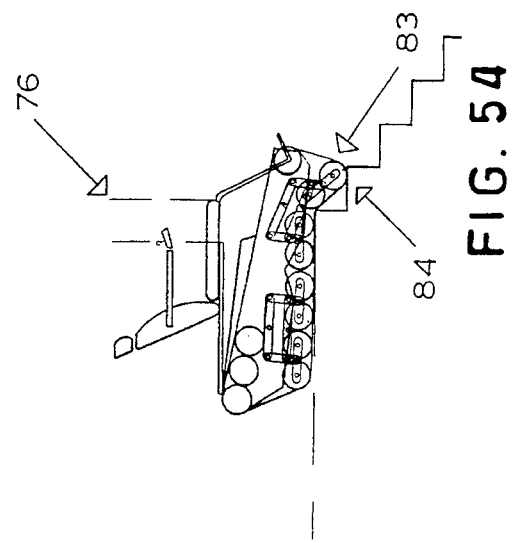
Figure 53:
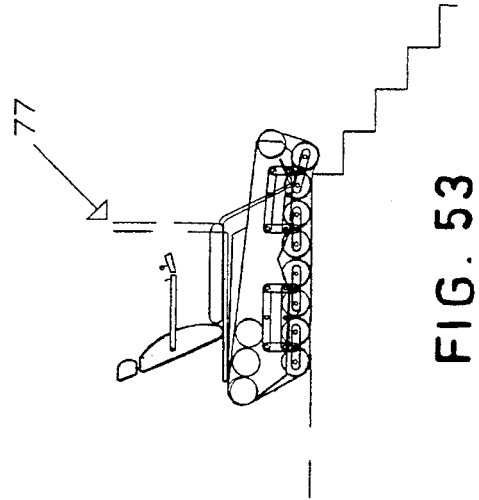
Figure 52:
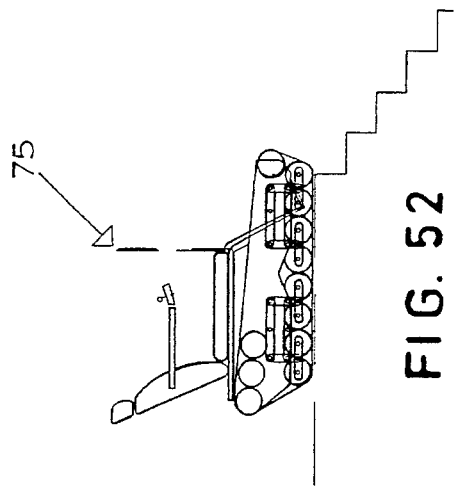

Commencing a descent, the seat is moved to position (76) FIGS. 53 and 54 through the first degrees of base unit transition to place more weight on the front trucks (83) forcing them to drop and make early weight bearing contact with the first step (84) of the stairs.

After the two front truck assemblies pass the top of the stairs, the seat is moved back quickly to the start position (75). As the level to decline transition continues, the seat is moved sequentially rearward to positions (77, 78, 79, 80, and 81) FIGS. 55 through 59, to maintain the proper center of gravity as dictated by the base unit pitch sensor (87).

Commencing an ascent, the seat is moved forward to position (76) FIG. 61, to take weight off the rear trucks (82). The base unit therefore expends less energy initiating the rearward climb. As the ascent proceeds and base unit pitch increases, the seat is moved sequentially rearward to positions (77, 78, 79, 80, and 81) to maintain the proper center of gravity as dictated by the base unit pitch sensor (87).

On FIG. 62, pitch level sensors (88A and 88B) and roll level sensor (87) used as limiters, detect and stop the base unit before it exceeds predetermined maximums along both the pitch and roll axis. The limiters reverse the motor direction control circuit FIGS. 73 and 74 and will only permit the device to proceed in the opposite direction until the unit is again operating within safe parameters. These safety controls are critical in that it is impossible to anticipate the mental capacity of each operator.

Figure 64:
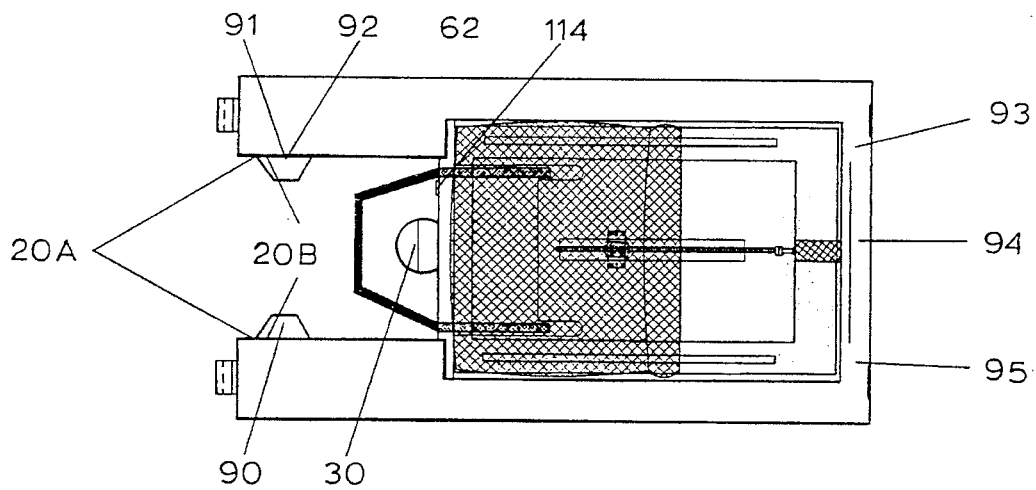
FIG. 64 A top view of the Base Unit frame, the ultra-sound units, and sensors.
Figure 65:
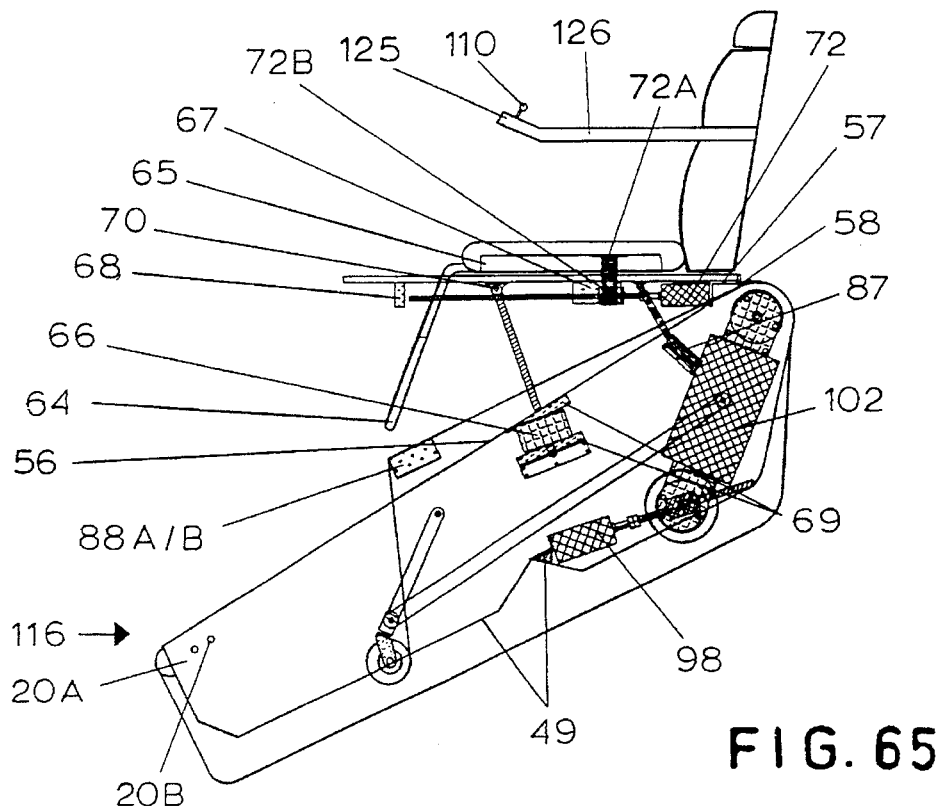
FIG. 65 A side view of the Base Unit frame, sensors, joystick, and operator console.
Figure 66:
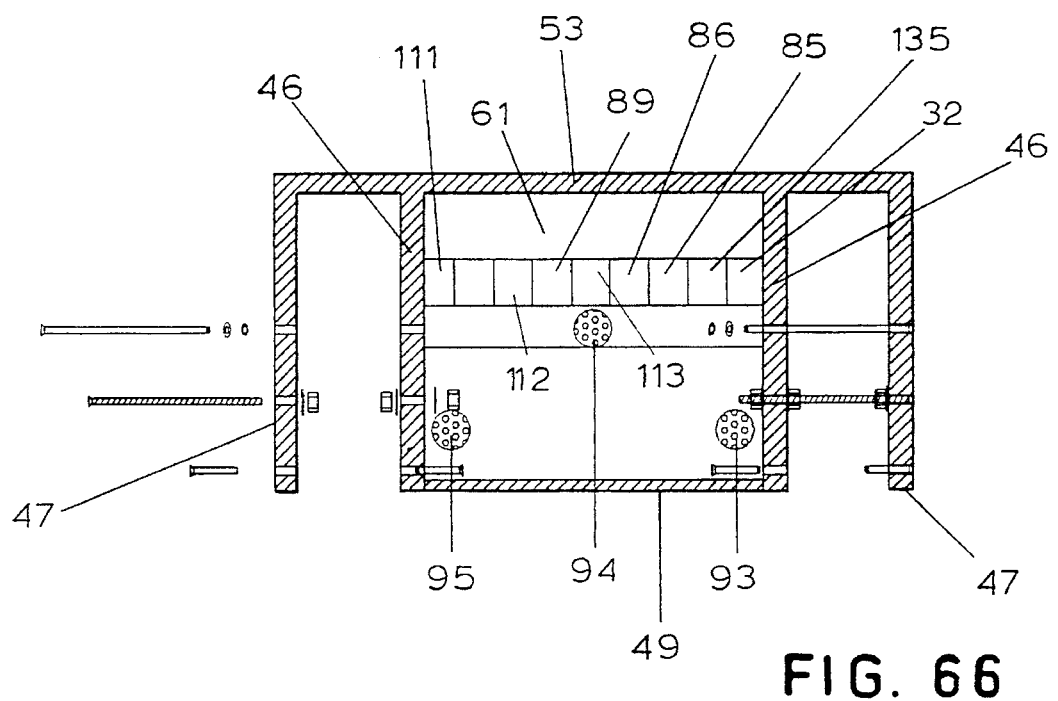
FIG. 66 A rear view of the Base Unit frame, electronics mounting plate, and ultra-sound units.
Figure 69:
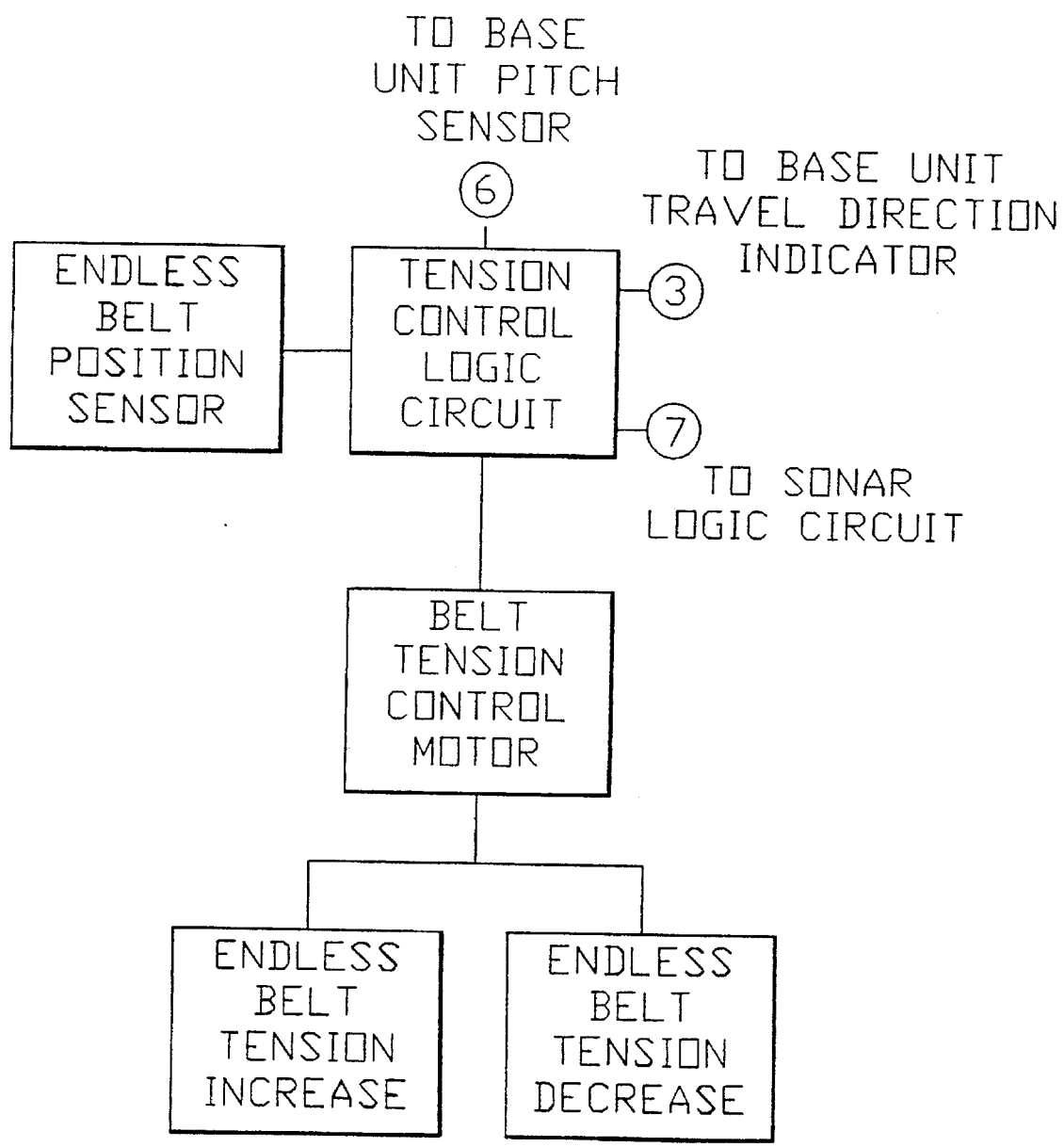
FIGS. 69 through 77 show the block diagrams of the electronic circuits that control the Brakes and Clutch, Cargo Platform, Seat (Ball Slide Table), Motors, Wheels, Speed, and safety of the Stair Climbing Device. Specifically.
Figure 70:
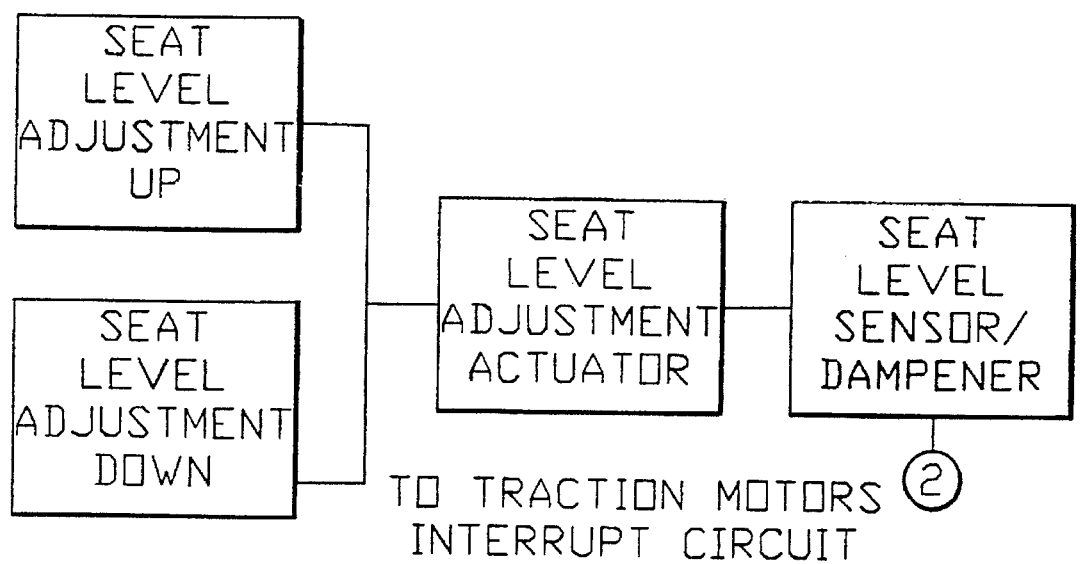
Figure 71:
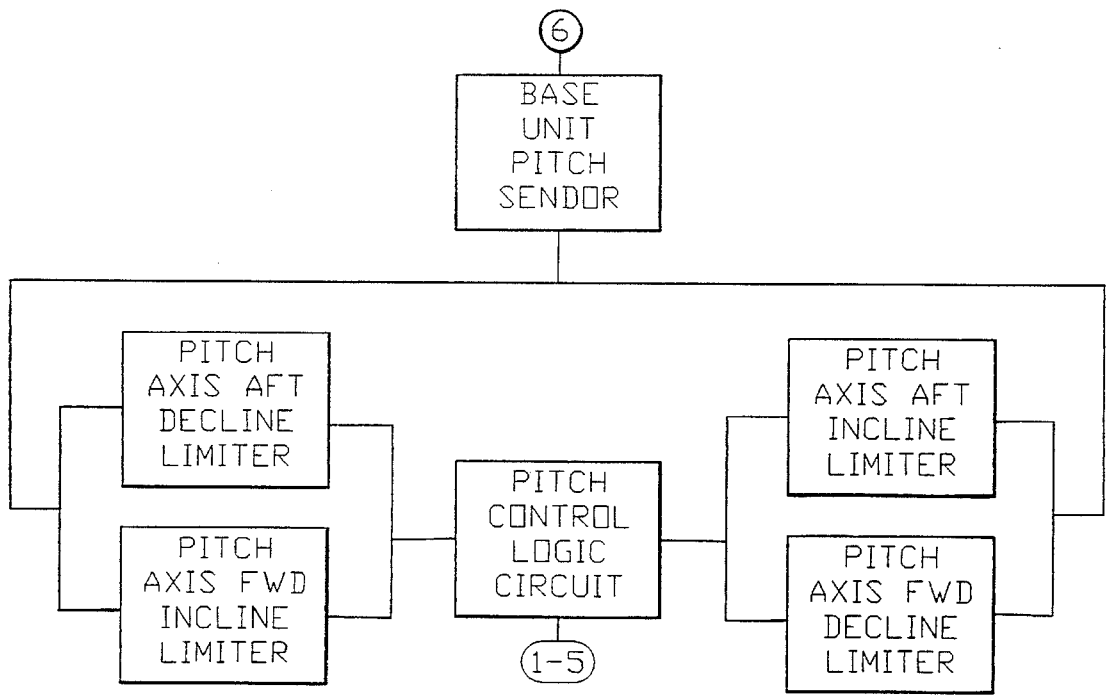
Figure 72:
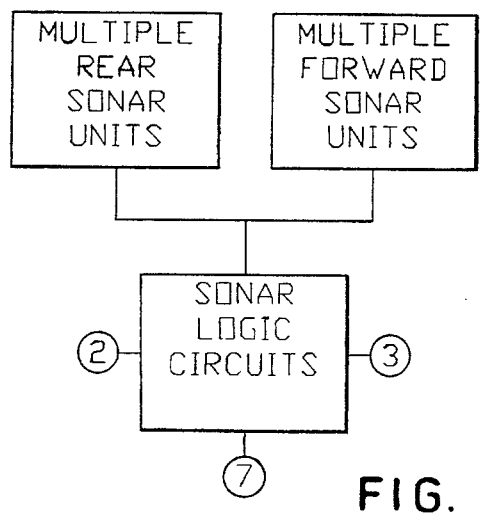
Figure 73:
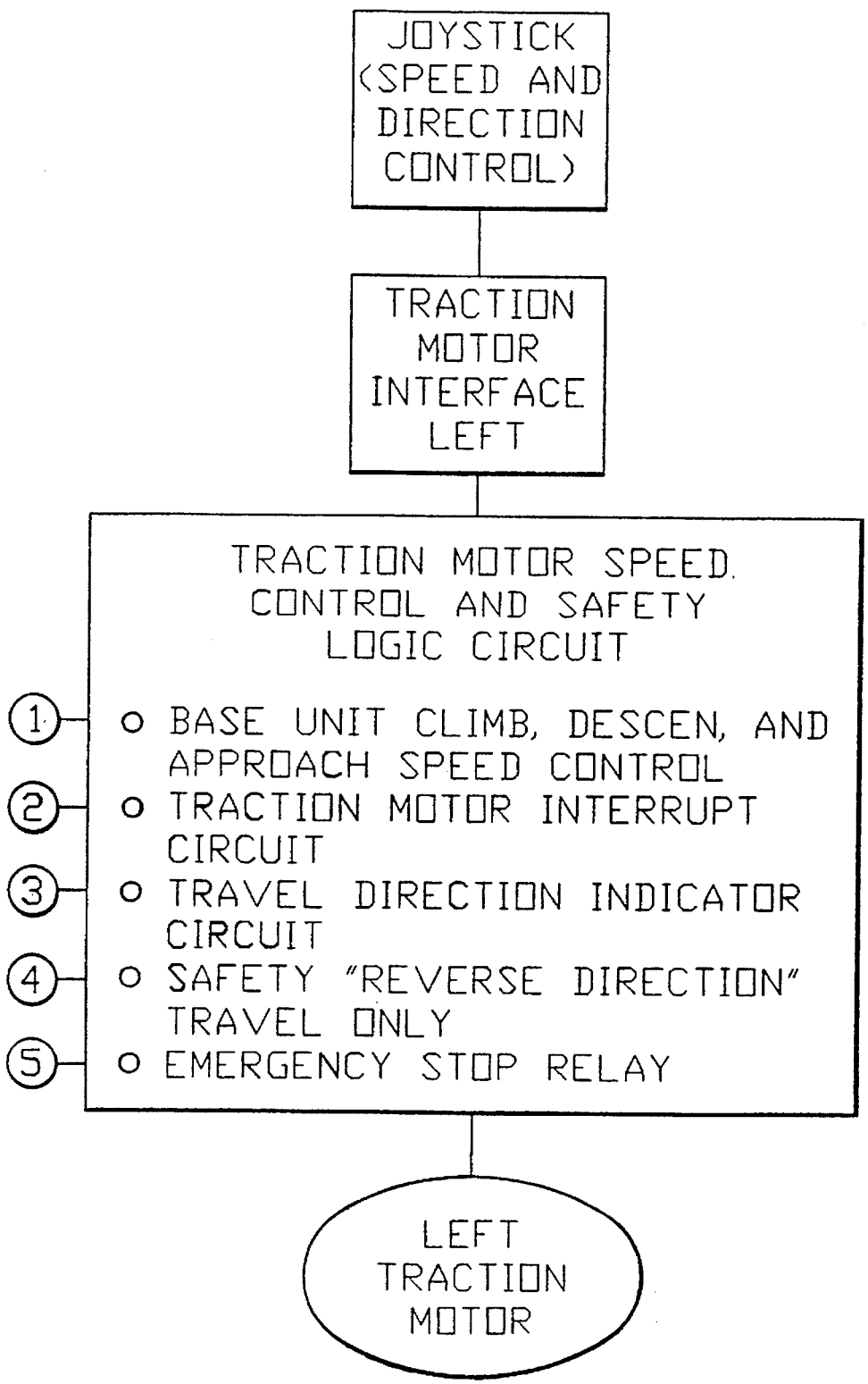
Figure 74:
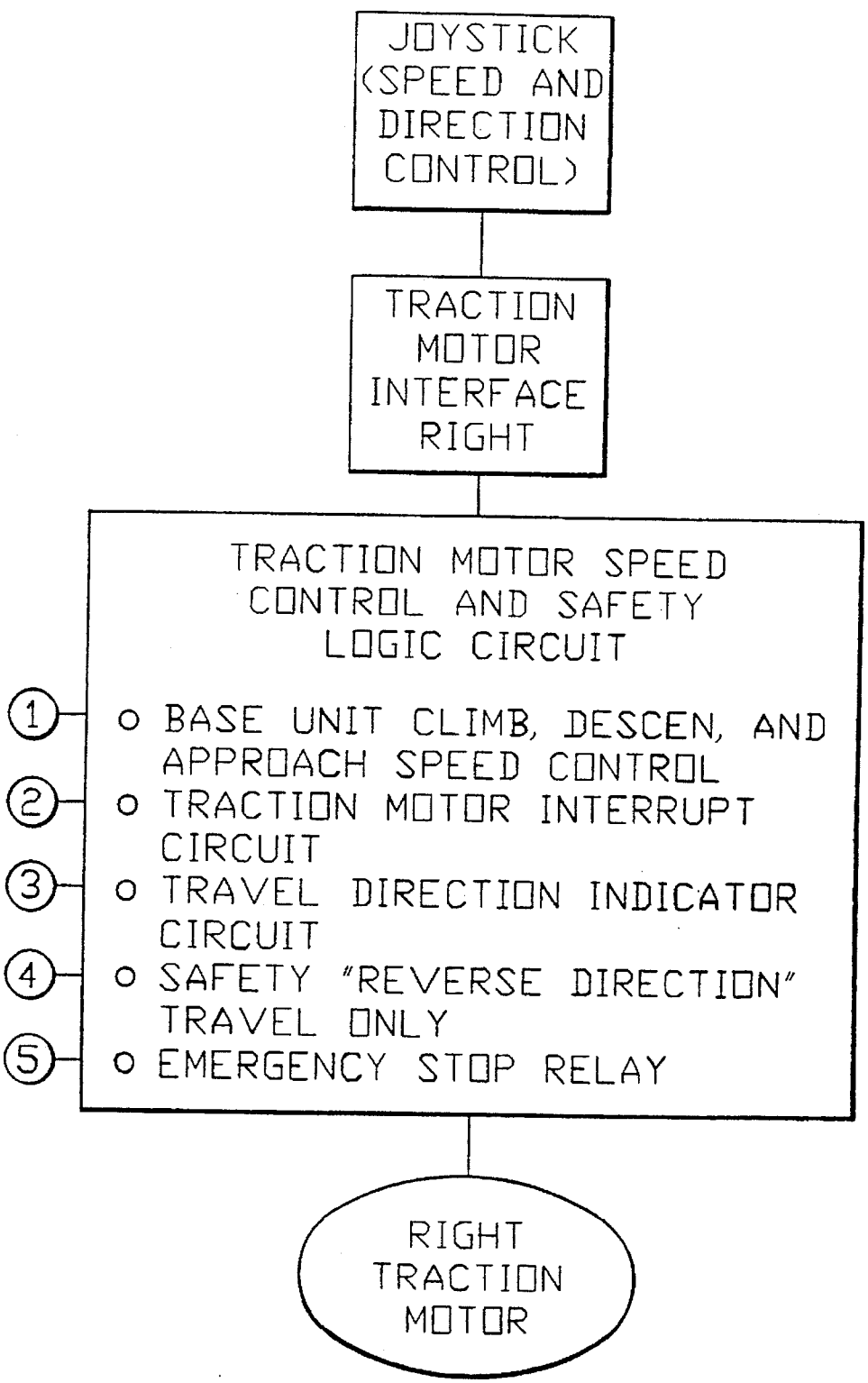

As shown on FIGS. 63 through 66 and diagramed on FIGS. 69 through 74, inputs from the upper idler pulley assembly position sensors (20A) and (20B) FIG. 69, dampened pitch sensor (67), pitch axis limiter (88) FIG. 71, travel direction indicator (85) FIGS. 73 and 74, and sonar logic circuit (86) FIG. 72, of the base unit, all contribute to the outputs of the Logic Control Circuit (32) FIG. 66. Ultrasound sensors mounted fore (90, 91, and 92) and aft (93, 94, and 95) on the unit FIGS. 64 and 66, continuously monitor the surface, depth, inclination and objects ahead or behind (depending on direction of travel) to identify unsafe drop-offs, stair angles, curbs, and obstacles and take preprogrammed action.

If an object is detected directly ahead of the direction of travel, the unit will reduce speed to either: (a) maintain a minimum distance between the object and the base unit, (b) allow time to maneuver around the object, or (c) if the operator can not avoid the object, logic circuits will only permit travel in the opposite direction of the hazard.

Figure 63:
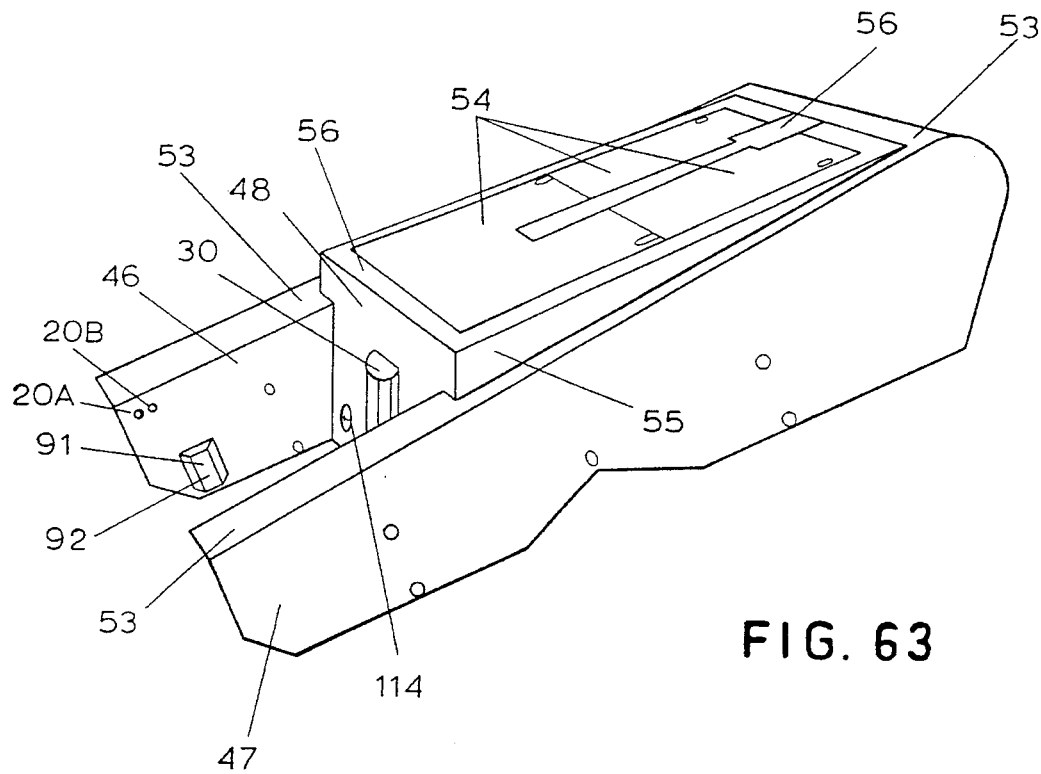
FIG. 63 A 3-D view of the Base Unit frame, ultra-sound units, sensors and quick battery charge connector.

If ultra-sound sensors (90 through 95) FIGS. 63 and 64 and pitch (67) and roll (68) sensors FIG. 65, detect that the stairs/surfaces to be climbed or descended exceed predetermined limits, logic circuits FIGS. 72 and 71, will only permit travel in the opposite direction of the hazard.

If outputs from ultra-sound sensors, pitch, and roll limiters (FIGS. 72, 71, and 75 respectively) sent to the logic control circuits FIGS. 73 and 74, indicate that the stairs to be traversed are within predetermined limits, then logic circuits FIGS. 73 and 74 assume supervisory control over direction override, pitch and roll axis, and speed of the unit through the traverse in tandem with the operators joystick.

First, vehicle velocity is decreased to transition (surface angle change) speed. Second, endless belt tension is increased for a climb or decreased for a descent. Third, logic circuits if necessary, further retard forward motion as seat pitch control actuators (66) FIG. 65, are directed by the logic circuit to maintain the seat perpendicular to gravity, and the base unit transitions to the angle of the stairs.

If roll limiters detect that the base unit has entered a hazardous angle along the roll axis, logic circuits FIGS. 73 and 74 will only permit travel in the opposite direction of the hazard. These safety controls are critical in that it is impossible to anticipate the mental capacity of each operator.

In four wheel operation, roll axis level sensor (89) FIG. 66 automatically compensate for deviations of up to twelve degrees by raising or lowering the wheels of either side. Also seat height can be electro-mechanically raised or lowered from the operator control panel (125) FIG. 65 on the arm rest (126) by extending the four wheels up to ball screw actuator (98) capacity.

With two wheel units FIGS. 44 and 45, wheel height adjustments are controlled solely at the operator control console (125).

Figure 67:
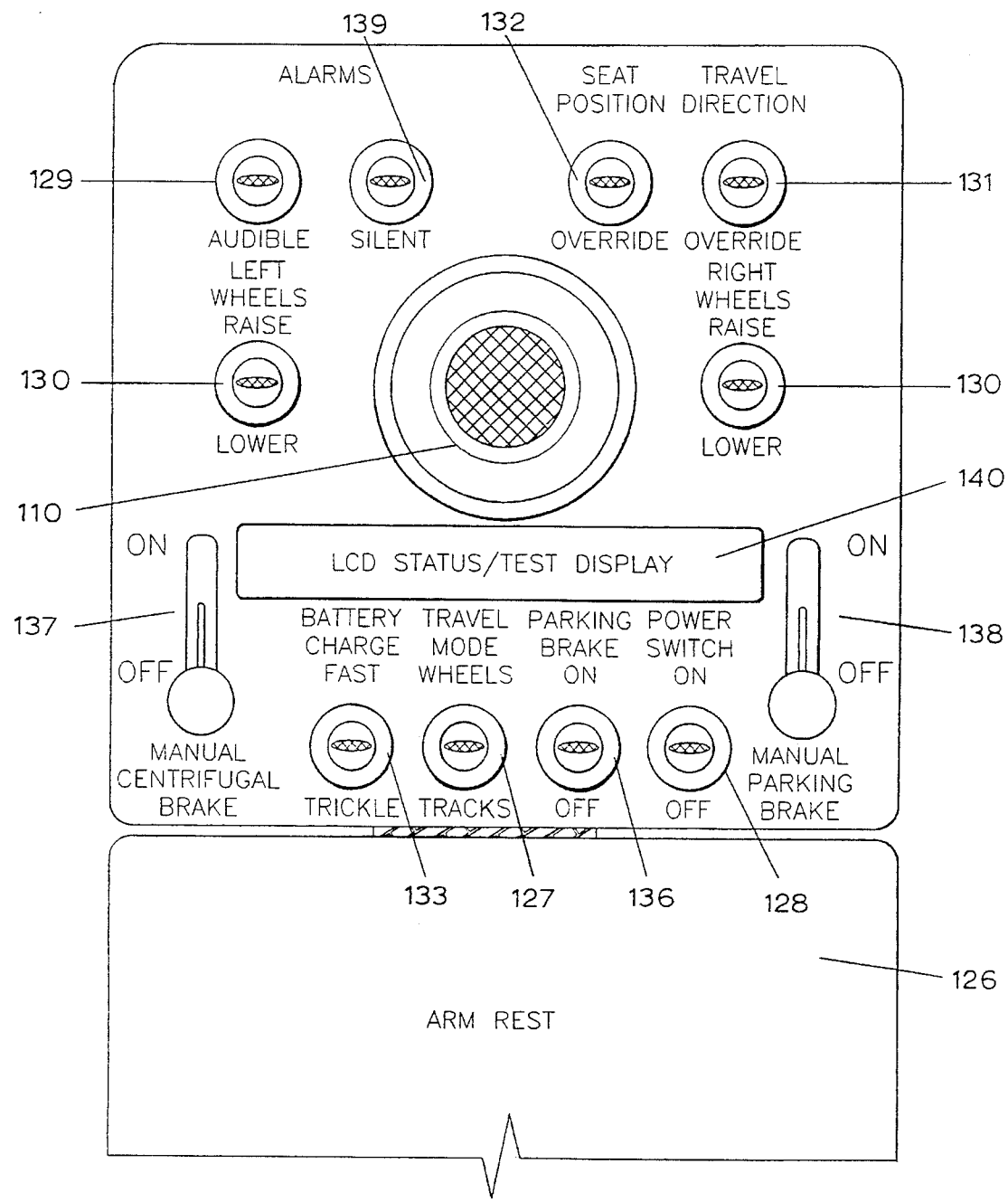
FIG. 67 Top view of operator console and controls.
Figure 68:
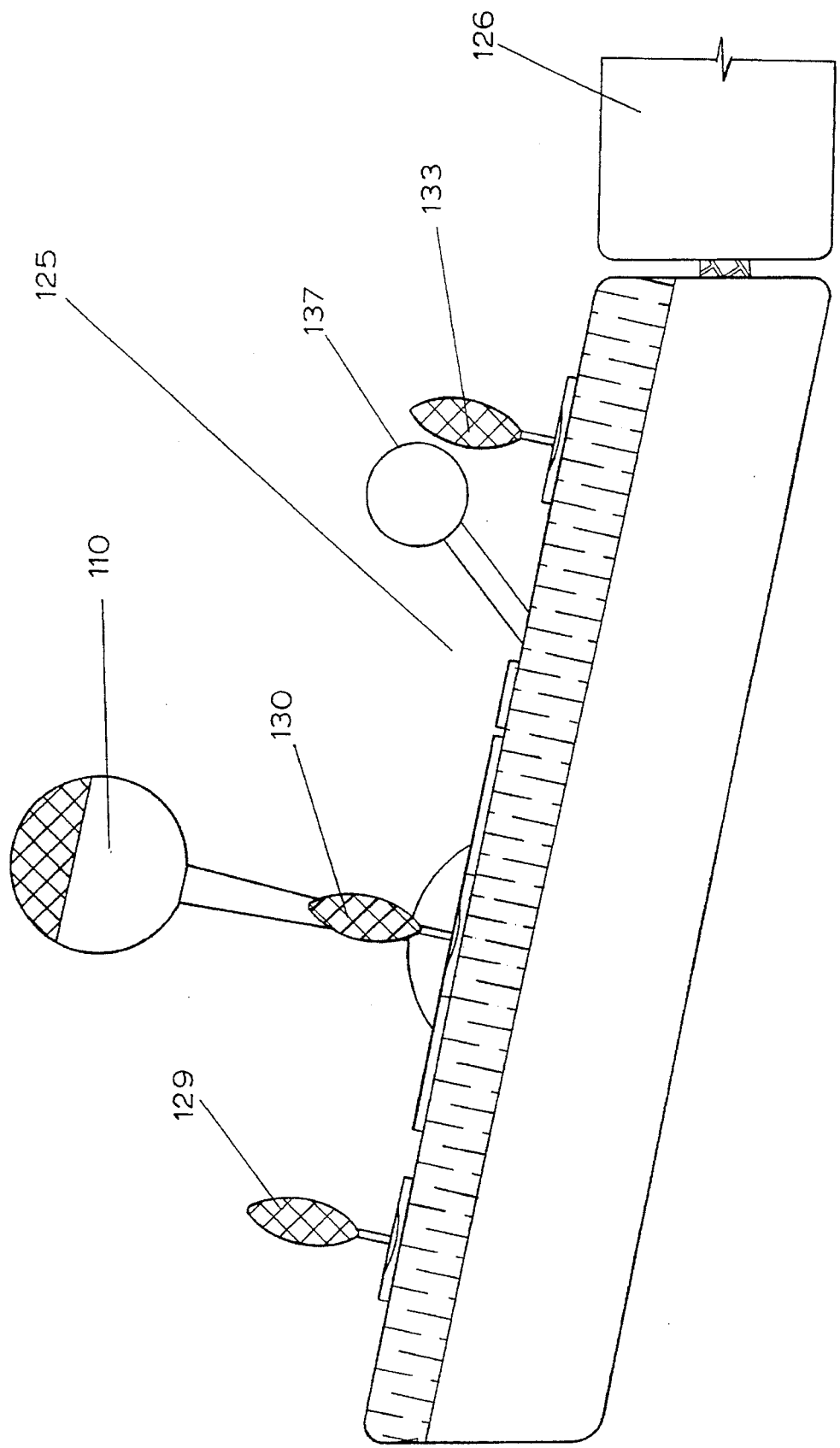
FIG. 68 Side view of operator console and controls.

A multi-function joystick (110) mounted atop the operator control console (125) of the arm rest FIGS. 65, 67, and 68, control the operation of the propulsion system via two motor controllers (111) installed on the electronics mounting plate (61) FIG. 66. The controllers minimize battery use by supplying current to the motors in precise pulses, on demand.

A joystick/D.C. Motor Controller interface circuit (112) FIG. 66 has been designed to eliminate the jerky change-of-direction experienced by the occupant of existing motorized wheelchairs and stair-climbing devices (patent applied for), smoothing user direction transitions. The user interface (112) works also with voice-activated, huff and puff, pressure sensitive, remote, and a variety of other controls.

A flat ribbon cable connects the user controls of the operator console, through the arm rest of the chair, to the electronics mounting plate in the base unit.

A test and maintenance interface (135) is installed in the base unit on the electronics mounting plate (61) to facilitate quick and easy equipment diagnostics and calibration via a plug in cable.

A battery charger (113) is installed in the battery compartment with a retractable cord to facilitate replenishing the batteries. Also installed on the front panel (48) of the base unit is a port (114) FIGS. 63 and 64 for quick charging the batteries from a car.

The cargo platform can be easily disconnected from the ball screw actuators to provide quick access to the electronics, D.C. motors and battery compartments.

The user operates the base unit independently of outside assistance. FIGS. 67 and 68 show the operator control panel (125) also houses switches that control: a loud audible alarm (129); base unit roll compensation (130); travel direction override (131); seat height and attitude override (132); quick or trickle charge for batteries (133), and parking brake (136).

Also housed in the operator control panel are the manual cable controls for the centrifugal brake (137) and the parking disc brake (138) and a status and test report LCD (140).

Optionally, the control panel can: transmit an emergency silent localizer alarm (139) to local law enforcement agencies; contain a voice activated cellular phone; and via various lock (128) configurations turn the base unit on and off.

Figure 75:
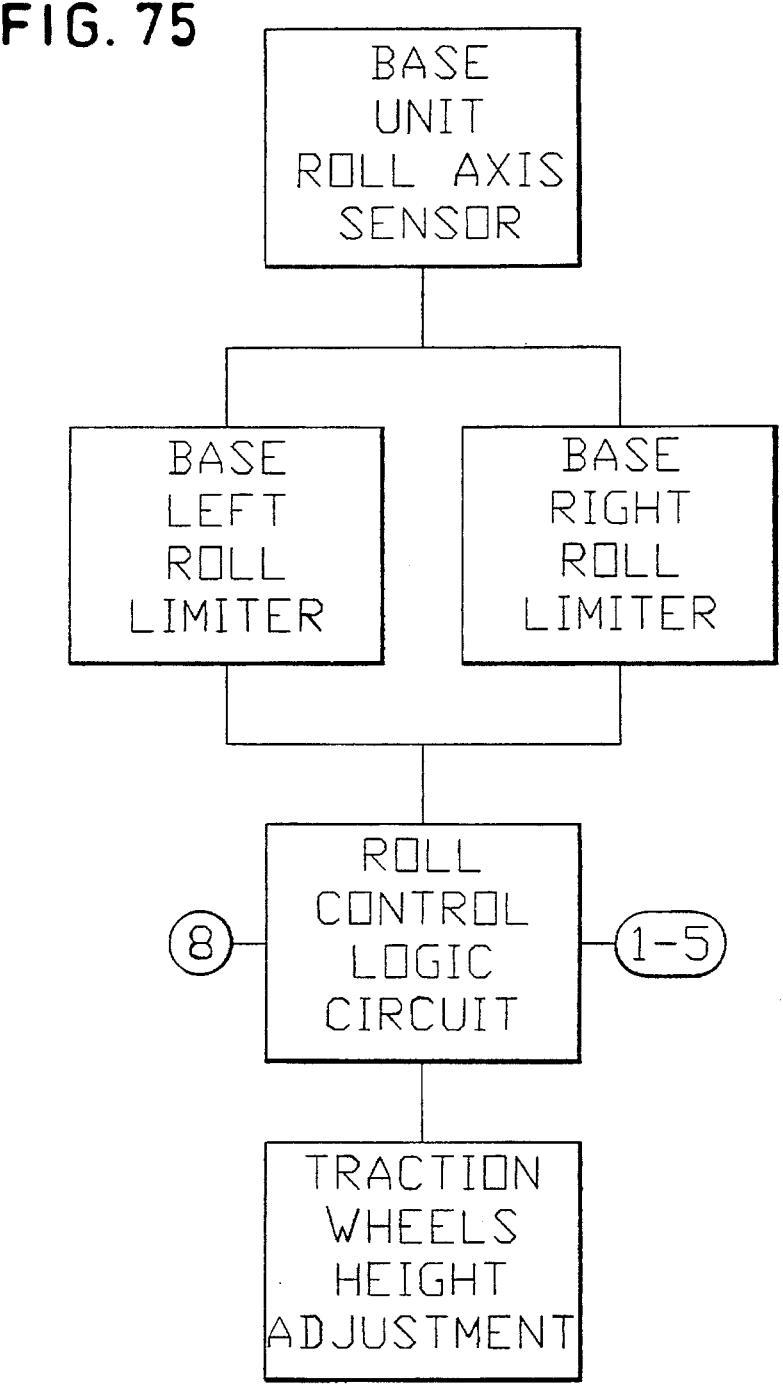
Figure 76:
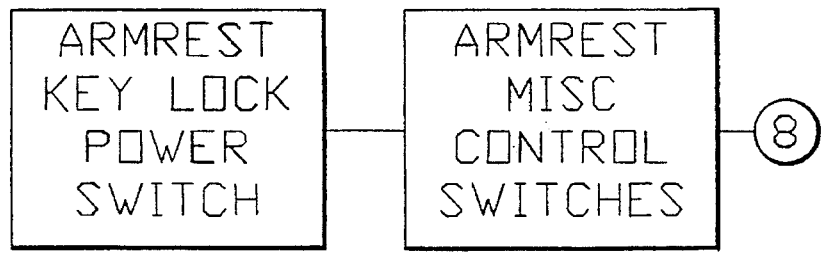
Figure 77:
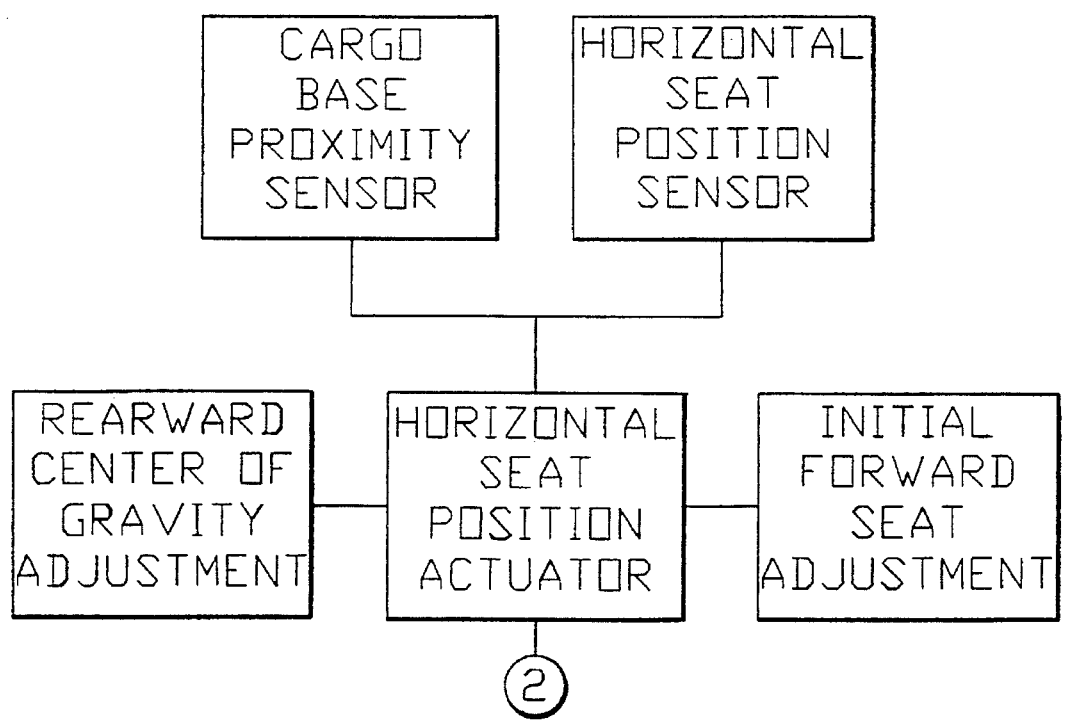

FIGS. 68 through 77 are block diagrams of the electronic circuits of each of the following electro-mechanical devices:

Endless Belt Tension Control FIG. 69
Seat Level Control FIG. 70
Base Unit Pitch Control FIG. 71
Sonar Units Logic Circuits FIG. 72
Logic Circuits Traction Motor Controls FIGS. 73 and 74
Base Unit Roll Axis Control FIG. 75
Operator Traction Motor Controls FIG. 76
Seat Center of Gravity Control FIG. 77

Presented are the associations between sensors, logic circuits, switches, actuators, and motors.

What is claimed is:

1. A surface climbing and descending vehicle, comprising:
 a base for supporting a platform to be maintained in a generally horizontal orientation;
 means for causing said platform to be maintained in a generally horizontal orientation;
 a pair of endless belts normally to be maintained in driving engagement with said surface; and
 means for deforming said endless belts to conform to said surface throughout climbing and descending;
 said surface deforming means including at least one truck assembly having a pair of trucks associated with each of said endless belts to conform to irregularities in said surface.

2. The vehicle of claim 1 including extendable and retractable wheel means for causing at least part of said endless belts to be lifted from driving engagement with said surface when said wheel means is extended.

3. The vehicle of claim 1 including extendable and retractable wheel means for causing the entirety of said endless belts to be lifted from driving engagement with said surface when said wheel means is extended.

4. The vehicle of claim 1 including an idler pulley associated with a forward end of each of said endless belts and means for extending and retracting said idler pulleys to adjust belt angle and belt tension.

5. The vehicle of claim 1 wherein said means for causing said platform to be maintained in a generally horizontal orientation includes means for automatically raising and lowering said platform as said vehicle is descending or climbing said surface, respectively.

6. The vehicle of claim 1 including a seat slidably mounted on said platform and means for sliding said seat forward to preload the front or deload the rear of said base upon initiating descending or climbing, respectively.

7. The vehicle of claim 6 having a center of gravity and including means for sliding said seat rearward to readjust said center of gravity relative to said base as said vehicle begins to proceed with descending or climbing said surface, respectively.

8. The vehicle of claim 7 including means for sliding said seat forward to again readjust said center of gravity relative to said base as said vehicle begins to complete descending or climbing said surface, respectively.

9. The vehicle of claim 1 wherein each of said endless belts are carried on a plurality of pulleys and said belts have inner cleats that mesh with teeth on each of said pulleys and outer cleats that grip said surface.

10. A surface climbing and descending vehicle, comprising:
 a base for supporting a platform to be maintained in a generally horizontal orientation;
 means for causing said platform to be maintained in a generally horizontal orientation including means for automatically raising and lowering said platform as said vehicle is descending or climbing said surface, respectively;
 a pair of endless belts normally to be maintained in driving engagement with said surface; and
 means for causing said endless belts to conform to said surface during climbing and descending including at least one truck assembly having a pair of trucks associated with each of said endless belts to conform to irregularities in said surface.
 each of said endless belts being carried on a plurality of pulleys mounted on each of said truck assemblies and said belts having inner cleats that mesh with teeth on each of said pulleys and outer cleats that grip said surface.

11. The vehicle of claim 10 wherein said means for causing said endless belts to conform to said surface includes a pair of truck assemblies associated with each of said endless belts, each of said truck assemblies having a pair of said trucks and each of said trucks having a pair of said pulleys, each of said trucks being formed by joining an axle of each of a pair or said pulleys with a lateral spar on each of opposite sides thereof, each of said truck assemblies being formed by joining said lateral spars on each of opposite sides of said pulleys with a pair of stanchions connected by a pair of cross-members.

12. The vehicle of claim 11 wherein each of said lateral spars has one end of one of said stanchions pivotally connected thereto at a generally intermediate point along the length thereof, each of said pairs of stanchions having the ends thereof opposite the corresponding ones of said lateral spars pivotally connected to the ends of one of the corresponding pair of said cross-members, each of said pairs of stanchions also being pivotally connected to the ends of the other of the corresponding pair of said cross-members at intermediate points along their lengths.

13. The vehicle of claim 12 wherein each of the forwardmost of said cross-members have an axle-receiving hole forward of the center thereof and said base has axle means associated with each of the forwardmost of said cross-members, said axle means and cross-members preloading the forwardmost of said truck assemblies and also accommodating pivoting movement of each of the forwardmost of said truck assemblies to cause each of said endless belts to conform to irregularities in said surface.

14. The vehicle of claim 13 wherein each of the rearwardmost of said cross-members have an axle-receiving hole substantially in the center thereof and said base has axle means associated with each of the rearwardmost of said cross-members, said axle means and cross-members balancing the rearwardmost of said truck assemblies and also accommodating pivoting movement of each of the rearwardmost of said truck assemblies to cause each of said endless belts to conform to irregularities in said surface.

15. The vehicle of claim 10 wherein said pulleys carrying each of said endless belts are aligned in a row from front to back with a pair of said truck assemblies being operatively associated with each of said endless belts and with each of said truck assemblies being comprised of a pair of said pulleys operatively associated with each of said trucks.

16. The vehicle of claim 15 wherein each of said pairs of pulleys are joined on opposite sides by a lateral spar and including stop means associated with the forwardmost ones of said lateral spars and the rearwardmost ones of said lateral spars to thereby limit fore-upward rotation and aft-upward rotation of forwardmost and rearwardmost ones of said trucks.

17. The vehicle of claim 10 including extendable and retractable wheel means for causing at least part of said endless belts to be lifted from driving engagement with said surface when said wheel means is extended and including a pair of gimbaling wheel supported on a hinged mount to be extendable and retractable by motor driven ball screw actuator means.

18. The vehicle of claim 10 including extendable and retractable wheel means for causing the entirety of said endless belts to be lifted from driving engagement with said surface when said wheel means is extended and including a pair of front gimbaling wheels and a pair of rear wheels extendable and retractable by motor driven ball screw actuator means.

19. The vehicle of claim 18 including means for driving said rear wheels when said wheel means is extended.

20. The vehicle of claim 10 including an idler pulley associated with a forward end of each of said endless belts and means for extending and retracting said idler pulleys to adjust belt angle and belt tension.

21. The vehicle of claim 10 including a seat slidably mounted on said platform and means for sliding said seat forward to preload the front or deload the rear of said base upon initiating descending or climbing, respectively, and further including means for sliding said seat rearward to readjust the center of gravity relative to said base as said vehicle proceeds with descending or climbing said surface, respectively, and further including means for sliding said seat forward to again readjust the center of gravity relative to said base as said vehicle completes descending or climbing said surface, respectively.

22. A surface climbing and descending vehicle, comprising:

a base for supporting a platform to be maintained in a generally horizontal orientation;

means for causing said platform to be maintained in a generally horizontal orientation including means for automatically raising and lowering said platform as said vehicle is descending or climbing said surface, respectively;

a pair of endless belts normally to be maintained in driving engagement with said surface;

means for causing said endless belts to conform to said surface during climbing and descending including at least one truck assembly having a pair of trucks associated with each of said endless belts to conform to irregularities in said surface;

each of said endless belts being carried on a plurality of pulleys mounted on each of said truck assemblies and said belts having inner cleats that mesh with teeth on each of said pulleys and outer cleats that grip said surface;

said pulleys carrying each of said endless belts being aligned in a row from front to back with a pair of said truck assemblies being operatively associated with each of said endless belts and with each of said truck assemblies being comprised of a pair of said pulleys operatively associated with each of said trucks;

an idler pulley associated with a forward end of each of said endless belts and means for extending and retracting said idler pulleys to adjust belt angle and belt tension;

a drive pulley associated with a rearward end of each of said endless belts and motor means for imparting rotation to said drive pulleys to thereby impart movement to said endless belts.

23. The vehicle of claim 22 including a pair of additional pulleys closely positioned relative to each of said drive pulleys and freely mounted for rotation transmitted from said drive pulley through the corresponding one of said endless belts when said motor means imparts rotation to said drive pulleys.

24. The vehicle of claim 22 wherein said idler pulleys are each supported for rotation on bracket means positioned above the forwardmost of said truck assemblies and said bracket means is mounted for telescopic movement to cause said idler pulley to be extended and retracted in response to operating conditions.

* * * * *

UNITED STATES PATENT AND TRADEMARK OFFICE
CERTIFICATE OF CORRECTION

PATENT NO. : 5,577,567
DATED : November 26, 1996
INVENTOR(S) : Robert E. Johnson It is certified that error appears in the above-identified patent and that said Letters Patent is hereby corrected as shown below:

Column 1, line 22, please delete "ambulations" and insert - -ambulation- -;

Column 3, line 63, please delete "applications" and insert - -application- -;

Column 3, line 65, please delete "applications" and insert - -application- -;

Column 5, line 27, please delete "group" and insert - -ground- -;

Column 5, line 36, please delete "on" and insert - -one- -;

Column 6, line 3, please delete "sever" and insert - -serve- -;

Column 8, line 11, please delete "access" and insert - -excess- -;

Column 8, line 11, please delete "forth" and insert - -forty- -;

Column 8, line 61, please delete "on" and insert - -one- -;

Column 9, line 38, please delete "each" and insert - -easy- -;

Column 9, line 50, please delete "then" and insert - -than- -;

Column 9, line 54, please delete "configuration" and insert - -configurations- -;

Column 10, line 15, please delete "(98)" and insert - -(97)- -;

Column 10, line 20, please delete "(12)" and insert - -(125)- -;

Column 12, line 21, please delete "miler" and insert - -mile- -;

UNITED STATES PATENT AND TRADEMARK OFFICE
CERTIFICATE OF CORRECTION

PATENT NO. : 5,577,567
DATED : November 26, 1996
INVENTOR(S) : Robert E. Johnson It is certified that error appears in the above-identified patent and that said Letters Patent is hereby corrected as shown below:

Column 12, line 25, please delete "62 though" and insert --52 through--;

Column 16, line 14, please delete "." and insert - -;- -;

Column 16, line 26, please delete "or" and insert - -of- -; and

Column 17, line 9, please delete "wheel" and insert - -wheels- -.

Signed and Sealed this

Eighth Day of February, 2000

*Attest:*

Q. TODD DICKINSON

*Attesting Officer*   *Commissioner of Patents and Trademarks*